US012592385B2

(12) United States Patent
Matsumoto et al.

(10) Patent No.: US 12,592,385 B2
(45) Date of Patent: Mar. 31, 2026

(54) METHOD FOR MANUFACTURING POSITIVE-ELECTRODE ACTIVE MATERIAL PRECURSOR AND POSITIVE-ELECTRODE ACTIVE MATERIAL FOR NONAQUEOUS ELECTROLYTE SECONDARY BATTERY

(71) Applicant: SUMITOMO METAL MINING CO., LTD., Tokyo (JP)

(72) Inventors: Satoshi Matsumoto, Chiba (JP); Shuuzou Ozawa, Ehime (JP); Kikoo Uekusa, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 115 days.

(21) Appl. No.: 18/643,289

(22) Filed: Apr. 23, 2024

(65) Prior Publication Data

US 2024/0282959 A1 Aug. 22, 2024

Related U.S. Application Data

(62) Division of application No. 16/067,218, filed as application No. PCT/JP2017/000170 on Jan. 5, 2017, now abandoned.

(30) Foreign Application Priority Data

Jan. 6, 2016 (JP) ................................. 2016-001357
Sep. 23, 2016 (JP) ................................. 2016-186238

(51) Int. Cl.
*H01M 4/525* (2010.01)
*C01G 53/06* (2006.01)
(Continued)

(52) U.S. Cl.
CPC ............ *H01M 4/525* (2013.01); *C01G 53/06* (2013.01); *C01G 53/50* (2013.01); *C01G 53/82* (2025.01);
(Continued)

(58) Field of Classification Search
CPC ...... H01M 4/525; H01M 4/505; C01G 53/82; C01G 53/06; C01G 53/50; C01P 2002/54;
(Continued)

(56) References Cited

U.S. PATENT DOCUMENTS 10,829,385 B2 11/2020 Matsumoto et al.
11,217,790 B2 1/2022 Matsumoto et al.
(Continued)

FOREIGN PATENT DOCUMENTS

CN 103441255 12/2013
CN 104779388 A * 7/2015 .......... H01M 4/1397
(Continued)

OTHER PUBLICATIONS

CN 104779388 English Translation (Year: 2015).*
(Continued)

*Primary Examiner* — Jimmy Vo
(74) *Attorney, Agent, or Firm* — IPUSA, PLLC

(57) ABSTRACT

A method for manufacturing a positive-electrode active material precursor for a nonaqueous electrolyte secondary battery containing a nickel-cobalt-manganese carbonate compound includes: an initial aqueous solution preparation process of preparing an initial aqueous solution; a nucleation process of forming nuclei; and a nucleus growth process of growing the nuclei. In the nucleation process, a pH value of the mixed aqueous solution is controlled to be greater than or equal to 8.0 at the reference reaction temperature of 25° C. In the nucleus growth process, the pH value of the mixed aqueous solution is controlled to be greater than or equal to 6.0 and less than or equal to 7.5 at the reference reaction temperature of 25° C. The nucleation process takes a time greater than or equal to $\frac{1}{20}$ and less than or equal to $\frac{3}{10}$ of a combined time of the nucleation process and the nucleus growth process.

6 Claims, 3 Drawing Sheets

(51) Int. Cl.
    *C01G 53/50*        (2025.01)
    *C01G 53/82*        (2025.01)
    *H01M 4/505*        (2010.01)
    *H01M 4/02*        (2006.01)

(52) U.S. Cl.
    CPC ......... *H01M 4/505* (2013.01); *C01P 2002/54*
        (2013.01); *C01P 2004/03* (2013.01); *C01P*
        *2004/34* (2013.01); *C01P 2004/61* (2013.01);
        *C01P 2006/40* (2013.01); *H01M 2004/025*
        (2013.01); *H01M 2004/028* (2013.01)

(58) Field of Classification Search
    CPC .............. C01P 2002/03; C01P 2002/34; C01P
        2002/61; C01P 2006/40; C01P 2004/03;
        C01P 2004/34; C01P 2004/61; C01P
        2004/025; C01P 2004/028
    See application file for complete search history.

(56)              References Cited

U.S. PATENT DOCUMENTS

| | | | |
|---|---|---|---|
| 2008/0057396 A1 | 3/2008 | Fujihara et al. | |
| 2008/0193841 A1 | 8/2008 | Sun et al. | |
| 2009/0297947 A1 | 12/2009 | Deng et al. | |
| 2013/0032753 A1 | 2/2013 | Yamamoto et al. | |
| 2013/0078520 A1* | 3/2013 | Toya ...................... | C01G 53/00 |
| | | | 429/223 |
| 2013/0230775 A1 | 9/2013 | Endo | |
| 2013/0313471 A1 | 11/2013 | Endo et al. | |
| 2014/0154581 A1 | 6/2014 | Kawasato et al. | |
| 2014/0242463 A1 | 8/2014 | Song et al. | |
| 2014/0306151 A1 | 10/2014 | Endo | |
| 2015/0079471 A1* | 3/2015 | Fang ...................... | H01M 4/525 |
| | | | 427/126.3 |
| 2016/0093881 A1 | 3/2016 | Schroedle et al. | |
| 2016/0308197 A1 | 10/2016 | Hong et al. | |
| 2017/0050864 A1 | 2/2017 | Matsumoto et al. | |
| 2022/0077465 A1 | 3/2022 | Matsumoto et al. | |

FOREIGN PATENT DOCUMENTS

| | | | | | |
|---|---|---|---|---|---|
| CN | 104953110 | 9/2015 | | | |
| CN | 104993122 | 10/2015 | | | |
| JP | 2008-535173 | 8/2008 | | | |
| JP | 2011-028999 | 2/2011 | | | |
| JP | 2011-146392 | 7/2011 | | | |
| JP | 2011-181193 | 9/2011 | | | |
| JP | 2011-198759 | 10/2011 | | | |
| JP | 2012-151083 | 8/2012 | | | |
| JP | 2012-252964 | 12/2012 | | | |
| JP | 2013-182782 | 9/2013 | | | |
| JP | 2013-229339 | 11/2013 | | | |
| JP | 2014-510004 | 4/2014 | | | |
| JP | 2015-191847 | 11/2015 | | | |
| JP | 2016-069209 | 5/2016 | | | |
| JP | 2016069209 A | * | 5/2016 | | |
| KR | 20120101093 A | * | 9/2012 | ............. | C01G 53/82 |
| WO | 2012/169274 | 12/2012 | | | |
| WO | 2013/084923 | 6/2013 | | | |
| WO | 2014/069469 | 5/2014 | | | |
| WO | 2014/180686 | 11/2014 | | | |

OTHER PUBLICATIONS

JP 2016069209 English Translation (Year: 2016).*
KR 20120101093 English Translation (Year: 2012).*
Yuichi Sato, R&D of Solid Solution Cathode Materials for Lithium Ion Batteries, FB Technical News, No. 66, Jan., 2011, pp. 3-10, with English Abs.
International Search Report mailed on Apr. 4, 2017 with respect to PCT/JP2017/000170.
International Search Report mailed on Apr. 4, 2017 with respect to PCT/JP2017/000148.
Office Action mailed on Jan. 31, 2020 issued with respect to the related U.S. Appl. No. 16/066,445.
Office Action dated Nov. 19, 2021 issued with respect to the corresponding U.S. Appl. No. 16/996,125.
Office Action dated Apr. 5, 2022 issued with respect to the related U.S. Appl. No. 16/996,125.

\* cited by examiner

METHOD FOR MANUFACTURING POSITIVE-ELECTRODE ACTIVE MATERIAL PRECURSOR AND POSITIVE-ELECTRODE ACTIVE MATERIAL FOR NONAQUEOUS ELECTROLYTE SECONDARY BATTERY

CROSS-REFERENCES TO RELATED APPLICATIONS

This application is a divisional application of and claims the benefit of priority under 35 U.S.C. 120 to patent application Ser. No. 17/181,233 filed on Feb. 22, 2021, that is a divisional application of and claims the benefit of priority under 35 U.S.C. 120 to patent application Ser. No. 16/067, 218 filed on Jan. 5, 2017, which has effectively entered under 35 U.S.C. 371 (c) the national stage on Jun. 29 2018, from the PCT Application No. PCT/JP2017/000170, which claims priority to Japanese Patent Application No. 2016-001357, filed on Jan. 6, 2016, and Japanese Patent Application No. 2016-186238, filed on Sep. 23, 2016. The contents of these applications are incorporated herein by reference in their entirety.

TECHNICAL FIELD

The present invention relates to a positive-electrode active material precursor for a nonaqueous electrolyte secondary battery, a positive-electrode active material for a nonaqueous electrolyte secondary battery, a method for manufacturing a positive-electrode active material precursor for a nonaqueous electrolyte secondary battery, and a method for manufacturing a positive-electrode active material for a nonaqueous electrolyte secondary battery.

BACKGROUND ART

In recent years, spread of mobile electronic devices, such as cellular phones and notebook computers, has brought strong desire for development of small, light, nonaqueous electrolyte secondary batteries having high energy density. Development has also been strongly desired for high-output secondary batteries used as large-scale batteries such as a power source for driving a motor.

As secondary batteries that satisfy such demands, lithium-ion secondary batteries have been available. A lithium-ion secondary battery is constituted with a negative electrode, a positive electrode, an electrolyte solution, and the like; as an active material in the negative electrode and the positive electrode, materials capable of sustaining lithium insertion and disinsertion are used.

Research and development have been vigorously conducted in these days for lithium-ion secondary batteries. Among these, lithium-ion secondary batteries that use lithium metal composite oxide having a layered or spinel structure as the positive electrode material have been advanced for practical use because a voltage as high as 4 V can be obtained, and hence, a high energy density can be realized.

Materials that have been proposed for the positive electrode of such a lithium-ion secondary battery include lithium-cobalt composite oxide ($LiCoO_2$), which is relatively easily synthesized; lithium-nickel composite oxide ($LiNiO_2$), in which nickel cheaper than cobalt is used; lithium-nickel-cobalt-manganese composite oxide ($LiNi_{1/3}Co_{1/3}Mn_{1/3}O_2$); lithium-manganese composite oxide ($LiMn_2O_4$), in which manganese is used; lithium-nickel-cobalt-manganese composite oxide ($LiNi_{0.5}Mn_{0.5}O_2$); and lithium-rich nickel-cobalt-manganese composite oxide ($Li_2MnO_3$—$LiNi_xMn_yCo_zO_2$).

Among these positive-electrode active materials, lithium-rich nickel-cobalt-manganese composite oxide ($Li_2MnO_3$—$LiNi_xMn_yCo_zO_2$) has drawn attention in recent years because of its high capacity and superior thermal stability. This lithium-rich nickel-cobalt-manganese composite oxide is a layered compound as is lithium-cobalt composite oxide or lithium-nickel composite oxide (see Non-Patent Document 1).

Furthermore, methods for manufacturing a precursor for obtaining lithium-rich nickel-cobalt-manganese composite oxide are disclosed in, for example, Patent Document 1 and Patent Document 2.

PRIOR ART DOCUMENTS

Patent Documents

Patent Document 1: Japanese Laid-Open Patent Publication No. 2011-028999
Patent Document 2: Japanese Laid-Open Patent Publication No. 2011-146392

Non-Patent Documents

Non-Patent Document 1: FB technical news, No. 66, 2011.1

SUMMARY OF THE INVENTION

Problem to be Solved by the Invention

Meanwhile, in order to obtain favorable performance for a lithium-ion secondary battery (high cycling characteristic, low resistance, and high output), a positive-electrode active material used as the positive electrode material needs to have a large reaction surface area. Therefore, one may consider forming a particle to be contained in the positive-electrode active material, for example, as a particle having a hollow structure.

However, although Patent Documents 1 and 2 disclose methods for manufacturing precursors, and compositions of positive-electrode active materials to be manufactured by using the precursors, the documents do not mention the structure of the particle of the positive-electrode active material, and in particular, do not examine the internal structure of a secondary particle.

Thereupon, in view of such problems found in the above conventional technologies, it is an object of an aspect of the present invention to provide a positive-electrode active material precursor for a nonaqueous electrolyte secondary battery, which enables to form a positive-electrode active material for the nonaqueous electrolyte secondary battery containing particles having a hollow structure.

Means for Solving the Problem

In order to solve the above problem, according to an aspect of the present invention, a positive-electrode active material precursor for a nonaqueous electrolyte secondary battery, contains a nickel-cobalt-manganese carbonate composite represented by a general formula of $Ni_xCo_yMn_zM_tCO_3$ where $x+y+z+t=1$, $0.05 \leq x \leq 0.3$, $0.1 \leq y \leq 0.4$, $0.55 \leq z \leq 0.8$, and $0 \leq t \leq 0.1$ are satisfied; and M represents one or more additive elements selected from among Mg, Ca, Al, Ti, V, Cr, Zr, Nb, Mo, and W. The positive-electrode active material precursor includes secondary particles having an average particle diameter greater than or equal to 4 μm and less than or equal to 9 μm. The secondary particle includes a sparse central portion and a dense outer shell portion outside of the central portion, formed of primary particles.

Advantageous Effect of the Invention

According to an aspect of the present invention, it is possible to provide a positive-electrode active material precursor for a nonaqueous electrolyte secondary battery, which enables to form a positive-electrode active material for the nonaqueous electrolyte secondary battery containing particles having a hollow structure.

EMBODIMENTS FOR IMPLEMENTING THE INVENTION

Figure 1:
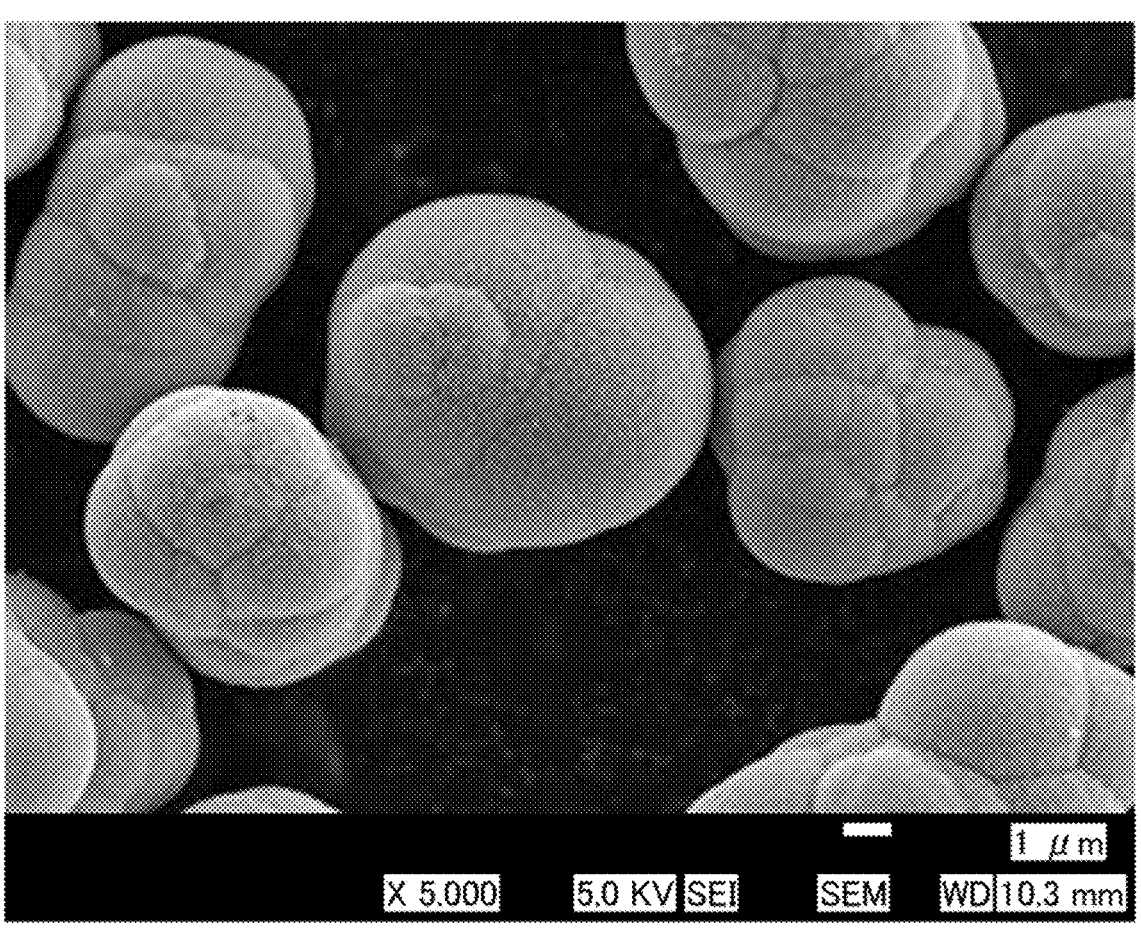
FIG. 1 is an SEM image of a positive-electrode active material precursor for a nonaqueous electrolyte secondary battery according to an embodiment of the present invention.

In the following, embodiments will be described with reference to the drawings. Note that the present invention is not limited to the following embodiments, and various modifications and replacements can be made without deviating from the scope of the present invention.

[Positive Electrode Active Material Precursor for Nonaqueous Electrolyte Secondary Battery]

In the embodiment, first, an example of a configuration of a positive-electrode active material precursor for a nonaqueous electrolyte secondary battery will be described.

It is possible for a positive-electrode active material precursor for a nonaqueous electrolyte secondary battery in the embodiment to contain a nickel-cobalt-manganese carbonate compound represented by a general formula of $Ni_xCo_yMn_zM_tCO_3$ where $x+y+z+t=1$, $0.05 \leq x \leq 0.3$, $0.1 \leq y \leq 0.4$, $0.55 \leq z \leq 0.8$, and $0 \leq t \leq 0.1$ are satisfied; and M represents one or more additive elements selected from among Mg, Ca, Al, Ti, V, Cr, Zr, Nb, Mo, and W.

It is favorable that the additive elements M in the general formula of the above nickel-cobalt-manganese carbonate compound contained in the positive-electrode active material precursor for the nonaqueous electrolyte secondary battery in the embodiment include Mo.

This is because the additive elements M of the nickel-cobalt-manganese carbonate compound including Mo enable to raise the initial discharge capacity of the nonaqueous electrolyte secondary battery that uses the positive-electrode active material for the nonaqueous electrolyte secondary battery obtained from the positive-electrode active material precursor for the nonaqueous electrolyte secondary battery including the nickel-cobalt-manganese carbonate compound.

It is also favorable that the content ratio of Mo is greater than or equal to 0.5 at % and less than or equal to 5 at % among the metal components in the above nickel-cobalt-manganese carbonate compound, namely, among Ni, Co, Mn, and the additive elements M.

This is because having the content ratio of Mo greater than or equal to 0.5 at % among the metal components in the nickel-cobalt-manganese carbonate compound especially enables to raise the initial discharge capacity of the nonaqueous electrolyte secondary battery that uses the positive-electrode active material for the nonaqueous electrolyte secondary battery obtained from the positive-electrode active material precursor for the nonaqueous electrolyte secondary battery including the nickel-cobalt-manganese carbonate compound. This is also because having the content ratio of Mo less than or equal to 5 at % among the metal components in the nickel-cobalt-manganese carbonate compound enables to more securely prevent the sphericity of the nickel-cobalt-manganese carbonate compound from declining.

As described above, the positive-electrode active material precursor for the nonaqueous electrolyte secondary battery in the embodiment (also simply referred to as the "precursor", below) may contain a nickel-cobalt-manganese carbonate compound, or may be formed of a nickel-cobalt-manganese carbonate compound.

Unlike virtually spherical secondary particles formed by aggregated multiple plate-shaped primary particles, which can be seen in hydroxide particles, the precursor in the embodiment can have virtually spherical secondary particles formed by aggregated fine primary particles having a high isotropy.

The precursor in the embodiment may contain secondary particles having the average particle diameter greater than or equal to 4 μm and less than or equal to 9 μm. Note that the precursor in the embodiment may be formed of the above secondary particles.

Here, the average particle diameter means a particle diameter calculated from a particle size distribution obtained with a laser diffraction and scattering method, with which the numbers of particles in respective particle diameter segments are accumulated to identify a particle diameter corresponding to the accumulated volume reaching 50% of the sum total volume of all the particles. In the following, the average particle diameter in this specification means the same.

A secondary particle contained in the precursor in the embodiment may have a sparse central portion constituted with fine primary particles, and a dense outer shell portion outside of the central portion.

Furthermore, the precursor in the embodiment can be especially suitably used as a material of a positive-electrode active material for a nonaqueous electrolyte secondary battery in the embodiment (also simply referred as the "positive-electrode active material", below) that has a hollow structure as will be described later.

In the following, the precursor in the embodiment will be specifically described.

(1) Particle Structure

FIG. 1 shows an example of a scanning electron microscope photograph (also simply referred as an "SEM", below) of the precursor in the embodiment.

As shown in FIG. 1, the precursor in the embodiment contains virtually spherical secondary particles; specifically, the precursor contains virtually spherical secondary particles formed by aggregated multiple fine granular primary particles. In addition, further in detail, the particle has a structure that includes a sparse central portion formed of fine primary particles on the inside, and includes a dense outer shell portion on the outside.

Here, the above central portion has a structure that has many voids between aggregated fine primary particles, and has the outer shell portion formed of dense primary particles outside of the central portion. Therefore, in the case of sintering the precursor in the embodiment, in the central portion, contraction caused by sintering starts occurring at a lower temperature compared with the outer shell portion. Then, during the sintering, the sintering proceeds from the center of a secondary particle where the sintering has started at the lower temperature, toward the outer shell portion where the sintering lags behind, and thereby, contraction occurs outward, to generate a space in the central portion. Also, considering the central portion has a lower density and a greater contraction rate, the central portion becomes to have a sufficient large space. In this way, the positive-electrode active material obtained after the sintering can have a hollow structure.

Secondary particles contained in the positive-electrode active material obtained by sintering the precursor in the embodiment may have a form of aggregated fine granular primary particle. In this case, it is favorable that fine primary particles forming secondary particles contained in the positive-electrode active material have the average particle diameter less than or equal to 300 nm. This is because if the average particle diameter of primary particles exceeds 300 nm, sintering tends to proceed easily, and it may become difficult to have an electrolytic solution permeate into the hollow portion. If it is difficult to have an electrolytic solution permeate into the hollow portion, it may become difficult to sufficiently exhibit improvement in the rate characteristic, which is an advantage of the positive-electrode active material including hollow secondary particles.

Also, in a secondary particle contained in the positive-electrode active material obtained by sintering the precursor, it is favorable that the thickness of the outer shell portion is greater than or equal to 5% and less than or equal to 30% in terms of the ratio to the particle diameter of the secondary particle. Having the thickness of the outer shell portion greater than or equal to 5% in terms of the ratio to the particle diameter of the secondary particle enables to securely prevent the particle from being crushed in a pressing process when forming an electrode sheet that uses the positive-electrode active material. Therefore, the skeleton can be maintained after the pressing process, which enables to sufficiently improve the battery performance. However, if exceeding 30%, the central portion may not be formed to have a sufficient size, and an electrolytic solution may be poorly permeated; in such a case, improvement in the rate characteristic cannot be expected.

Note that the particle diameter of a fine granular primary particle of the positive-electrode active material, and the ratio of the thickness of the outer shell portion to the particle diameter of a secondary particle in terms of the particle diameter of the secondary particle, which have been described as above, can be measured by observing the cross-section of the positive-electrode active material by using an SEM.

Specifically, for example, multiple secondary particles as particles of the positive-electrode active material are embedded in resin or the like, to which cross-sectional polisher processing or the like is applied so as to put it into a state in which cross-sectional observation of the particles can be performed. Then, the diameter or the maximum length of observable secondary particles is measured on a SEM image, from which calculation can be made for an average value of the ratio to the thickness of the outer shell portion. Note that the number of secondary particles to be evaluated is not limited in particular; it is favorable to evaluate multiple secondary particles, for example, 50 or more secondary particles.

Further in detail, a distance is measured for two points with which the shortest distance is obtained between the circumference of the outer shell portion and the inner circumference on the central portion side, to calculate the average thickness of the outer shell portion for each particle. Then, the average thickness is divided by a distance between any two points with which a maximum distance is obtained on the circumference of the secondary particle, as the secondary particle diameter; this enables to calculate the above ratio of the thickness of the outer shell portion for each particle.

(Average Particle Diameter)

As described already, it is favorable that secondary particles contained in the precursor in the embodiment has the average particle diameter greater than or equal to 4 μm and less than or equal to 9 μm, and it is more favorable to have the average particle diameter greater than or equal to 5 μm and less than or equal to 7 μm. Having the average particle diameter greater than or equal to 4 μm and less than or equal to 9 μm enables to easily adjust secondary particles contained in the positive-electrode active material to be obtained from the precursor in the embodiment as the raw material, to have a predetermined average particle diameter, for example, greater than or equal to 4 μm and less than or equal to 8 μm. As such, the particle diameter of secondary particles contained in the precursor particles correlates with the particle diameter of secondary particles contained in the positive-electrode active material to be obtained, and hence, has an influence on characteristics of a battery that uses the positive-electrode active material as the positive electrode material.

Specifically, if the average particle diameter of secondary particles contained in the precursor in the embodiment is less than 4 μm, the average particle diameter of secondary particles contained in the positive-electrode active material to be obtained may become smaller; the packing density of the positive electrode may decline; and the battery capacity per volume may decline. On the other hand, if the average particle diameter of secondary particles contained in the precursor exceeds 9 μm, the specific surface area of the positive-electrode active material may decline; the interface with the electrolytic solution decreases; and the resistance of the positive electrode rises. In addition, the void volume becomes greater, and it may become difficult to realize the electric discharge capacity per weight.

[Method for Manufacturing Positive-Electrode Active Material Precursor for Nonaqueous Electrolyte Secondary Battery]

Next, an example of a configuration will be described for a method for manufacturing of a positive-electrode active material precursor for a nonaqueous electrolyte secondary battery in the embodiment (also simply referred as the "method for manufacturing a precursor", below).

Note that the method for manufacturing the precursor in the embodiment can produce the precursor as described already, the contents already described may be omitted in part.

The method for manufacturing the precursor in the embodiment is a method for manufacturing the precursor by crystallization reaction, which includes an initial aqueous solution preparation process, a nucleation process, and a nucleus growth process as will be described later, and may be performed, for example, by batch reactive crystallization. Note that the obtained precursor may be washed and dried as necessary.

Specifically, the method for manufacturing the precursor in the embodiment relates to a method for manufacturing a positive-electrode active material precursor for a nonaqueous electrolyte secondary battery including a nickel-cobalt-manganese carbonate compound represented by a general formula of $Ni_xCo_yMn_zM_tCO_3$ where $x+y+z+t=1$, $0.05 \leq x \leq 0.3$, $0.1 \leq y \leq 0.4$, $0.55 \leq z \leq 0.8$, and $0 \leq t \leq 0.1$ are satisfied; and M represents one or more additive elements selected from among Mg, Ca, Al, Ti, V, Cr, Zr, Nb, Mo, and W. The method may include the following processes.

An initial aqueous solution preparation process of preparing an initial aqueous solution that contains an ammonium ion supplier and water, in which the pH value is controlled to be greater than or equal to 9.0 and less than or equal to 12.0 by an alkaline aqueous solution at a reference reaction temperature of 25° C., and the liquid temperature is set greater than or equal to 25° C. and less than or equal to 50° C.

A nucleation process of forming nuclei by adding and mixing, under the presence of carbonate ions, an aqueous solution that contains nickel as a metal component, an aqueous solution that contains cobalt as a metal component, an aqueous solution that contains manganese as a metal component, and an ammonium ion supplier, with the initial aqueous solution so as to form a mixed aqueous solution.

A nucleus growth process of growing the nuclei by adding and mixing, under the presence of carbonate ions, an aqueous solution that contains nickel as a metal component, an aqueous solution that contains cobalt as a metal component, an aqueous solution that contains manganese as a metal component, and an ammonium ion supplier, with the mixed aqueous solution formed in the nucleation process.

In addition, in the nucleation process, the pH value of the mixed aqueous solution may be controlled to become greater than or equal to 8.0 at the reference reaction temperature of 25° C. by adding an alkaline aqueous solution; and in the nucleus growth process, the pH value of the mixed aqueous solution may be controlled to become greater than or equal to 6.0 and less than or equal to 7.5 at the reference reaction temperature of 25° C. by adding an alkaline aqueous solution.

Also, among the combined time of the nucleation process and the nucleus growth process, the nucleation process may take a time greater than or equal to $\frac{1}{20}$ and less than or equal to $\frac{3}{10}$ of the combined time for adding the aqueous solution that contains nickel as a metal component, the aqueous solution that contains cobalt as a metal component, the aqueous solution that contains manganese as a metal component, and the ammonium ion supplier, to the initial aqueous solution.

In a conventional continuous crystallization method, since a nucleation reaction and a nuclear growth reaction advance simultaneously in the same reaction vessel, it has been difficult to have different denseness or sparsity in a particle. Also, in a batch reactive crystallization, simply dividing two processes based on pH, namely, a process of nucleation reaction and a process of nuclear growth reaction, may generate two compact layers on the inside and on the outside of a particle when made into a positive-electrode active material, and nothing is formed to connect the two layers. Therefore, the formed particle turned out to have a very poor internal conductivity.

In the following, each of the processes in the method for manufacturing the precursor in the embodiment will be specifically described.

(1) Initial Aqueous Solution Preparation Process (First Process)

In the initial aqueous solution preparation process, it is possible to prepare an initial aqueous solution that contains an ammonium ion supplier and water, in which the pH value is controlled to be greater than or equal to 9.0 and less than or equal to 12.0 by an alkaline aqueous solution at the reference reaction temperature of 25° C., and the liquid temperature is set to be greater than or equal to 25° C. and less than or equal to 50° C.

Although the ammonium ion supplier is not limited in particular, it is favorable that the ammonium ion supplier is either of, for example, an ammonium carbonate aqueous solution, ammonia water, an ammonium chloride aqueous solution, or an ammonium sulfate aqueous solution.

Also, it is also favorable that the alkaline aqueous solution is an aqueous solution of one or more substances selected from among sodium carbonate, sodium bicarbonate, potassium carbonate, sodium hydroxide, and potassium hydroxide.

The initial aqueous solution is formed to have the pH greater than or equal to 9.0 because crystallites to become a nucleus can be aggregated to have an appropriate size, and the average particle diameter of secondary particles contained in the obtained precursor can be controlled within a suitable range.

However, if the pH value of the initial aqueous solution exceeds 12.0, nuclei may be generated excessively in the nucleation process, which may make the average particle diameter of secondary particles contained in the obtained precursor too small. Also, grape-shaped aggregated secondary particles having undetermined forms tend to be generated in a great quantity, which could be a factor to lower the repletion when formed as a positive-electrode active material. Therefore, it is favorable that the pH value of the initial aqueous solution is less than or equal to 12.0, and it is more favorable to be less than or equal to 11.0.

The initial aqueous solution may be prepared, for example, in a reaction vessel, and in this case, although the fluid volume of the initial aqueous solution to be prepared in the reaction vessel is not limited in particular, it is favorable to prepare a fluid volume such that the initial aqueous solution can be stirred when causing reaction in the vessel.

In the initial aqueous solution, it is favorable to adjust the amount of addition of the ammonium ion supplier and water so that the ammonia concentration becomes greater than or equal to 3 g/L and less than or equal to 15 g/L.

In particular, it is favorable to control the ammonia concentration of the initial aqueous solution and the mixed aqueous solution, the latter of which will be described later, to become greater than or equal to 3 g/L and less than or equal to 15 g/L during the processes ranging from the initial aqueous solution preparation process to the nucleus growth process.

This is because having the ammonia concentration greater than or equal to 3 g/L in the initial aqueous solution and in the mixed aqueous solution enables to set the nucleation rate in the nucleation process to a suitable rate, and enables to easily obtain secondary particles having desired shapes and average particle diameter. In particular, it is possible to prevent generation of grape-shaped aggregated particles having undetermined forms.

However, if the ammonia concentration in the initial aqueous solution and the mixed aqueous solution exceeds 15 g/L, ammine complexes mainly of nickel are generated in a great quantity, the quantity not to be separated increases, and the nickel concentration in a precursor to be obtained may decline. In this case, to obtain a precursor having the target composition ratio, extra nickel needs to be added, which may lead to a cost increase. Therefore, it is favorable the ammonia concentration of the initial aqueous solution to be less than or equal to 15 g/L.

It is also favorable to control the initial aqueous solution to have the liquid temperature greater than or equal to 25° C. and less than or equal to 50° C.

This is because the liquid temperature greater than or equal to 25° C. enables to maintain the saturation solubility within a proper range, for example, for the ammonium ion supplier and the alkaline aqueous solution, and enables to prevent a part of components from separating in the nucleus growth process and the like.

However, if the liquid temperature exceeds 50° C., ammonia in the ammonium ion supplier evaporates at an accelerated rate, and hence, it may become difficult to control the ammonia concentration. Therefore, a temperature less than or equal to 50° C. is favorable as described above.

Note that it is favorable to control the liquid temperature of the mixed aqueous solution to be greater than or equal to 25° C. less than or equal to 50° C. also in the nucleation process and the nucleus growth process, which will be described later.

As described above, the initial aqueous solution can be prepared in a reaction vessel, and it is possible to have an inactive gas atmosphere in the reaction vessel, specifically, in a space delimited with the reaction vessel, the surface of the liquid in the reaction vessel, and the lid of the reaction vessel. Specifically, it is possible to have a nitrogen gas atmosphere. In this case, it is favorable that the oxygen concentration is less than 1 vol % in the reaction vessel.

Note that in the case where carbonate ions are supplied with carbon dioxide gas in the nucleation process and in the nucleus growth process as will be described later, in addition to the inactive gas or instead of the inactive gas, carbon dioxide gas may be supplied into the reaction vessel. Also in the case of supplying carbon dioxide gas, it is favorable that the oxygen concentration is less than 1 vol % in the reaction vessel. In the nucleation process and in the nucleus growth process, which will be described later, it is possible to use the same atmosphere in the reaction vessel as described here.

Also, for example, in the nucleation process, which will be described later, or in the nucleus growth process, in the case of mixing an aqueous solution that contains nickel as a metal component, an aqueous solution that contains cobalt as a metal component, an aqueous solution that contains manganese as a metal component, and optionally, an aqueous solution that further contains the additive elements (when collectively describing these aqueous solutions below, these will be referred to as the "metal-component-containing mixed aqueous solutions including an aqueous solution that contains nickel as a metal component"), to use it as a metal-component-containing mixed aqueous solution, the metal-component-containing mixed aqueous solution may be prepared in this process.

(2) Nucleation Process (Second Process)

Next, the nucleation process will be described.

In the nucleation process, it is possible to form a mixed aqueous solution so as to form nuclei, by adding and mixing, under the presence of carbonate ions, an aqueous solution that contains nickel as a metal component, an aqueous solution that contains cobalt as a metal component, an aqueous solution that contains manganese as a metal component, and an ammonium ion supplier, with the initial aqueous solution. In this case, it is favorable to supply and drop the metal-component-containing aqueous solutions including an aqueous solution that contains nickel as a metal component, and the ammonium ion supplier, into the initial aqueous solution at a fixed rate.

It is possible to form sparse secondary particles in the nucleation process.

In the nucleation process, it is possible to control the pH value of the mixed aqueous solution described above to be greater than or equal to 8.0 at the reference reaction temperature of 25° C., by adding an alkaline aqueous solution. The alkaline aqueous solution can be supplied, for example, by dropping into the initial aqueous solution.

This is because maintaining the pH value of the mixed aqueous solution to be greater than or equal to 8.0 enables to obtain a sufficient amount of generated nuclei, and enables to form sparse secondary particles. By forming sparse secondary particles, it is possible to manufacture a positive-electrode active material having a hollow structure, from the precursor containing the secondary particles.

Furthermore, reactive crystallization can be performed in the nucleation process by taking a time greater than or equal to $\frac{1}{20}$ and less than or equal to $\frac{3}{10}$ of the total time of the crystallization, in other words, by taking a time greater than or equal to $\frac{1}{20}$ and less than or equal to $\frac{3}{10}$ of the combined time of the nucleation process and the nucleus growth process, by adding the metal-component-containing aqueous solutions including an aqueous solution that contains nickel as a metal component to the initial aqueous solution.

This is because having the time of the nucleation process, or the crystallization time in the nucleation process greater than or equal to $\frac{1}{20}$ of the crystallization time included in the entire manufacturing process, enables to grow sparse secondary particles to have a sufficient size, and enables to obtain a hollow structure more securely when made as a positive-electrode active material. This time setting also enables to manufacture sparse secondary particles in a stabler way, and when made as a positive-electrode active material, mixing of dense particles can be securely prevented.

Also, having the time of the nucleation process to be less than or equal to $\frac{3}{10}$ of the crystallization time included in the entire manufacturing process enables to prevent sparse secondary particles from growing too large, and when made as a positive-electrode active material, enables to form an outer shell portion having a sufficient thickness. Sufficiently securing the thickness of the outer shell portion enables to maintain the skeleton, for example, in press-forming of an electrode, and enables to especially improve the battery performance, which is favorable. Especially, it is more favorable to have the time of the nucleation process to be less than or equal to $\frac{1}{5}$ of the crystallization time included in the entire manufacturing process.

Here, as the ammonium ion supplier and the alkaline aqueous solution, the same aqueous solutions can be used as in the case of the initial aqueous solution preparation process that has already been described. Also, the concentration and the like may be adjusted in a different way.

Next, an aqueous solution that contains nickel as a metal component, an aqueous solution that contains cobalt as a metal component, and an aqueous solution that contains manganese as a metal component, which are to be added in the initial aqueous solution in the nucleation process, will be described.

Each of an aqueous solution that contains nickel as a metal component, an aqueous solution that contains cobalt as a metal component, and an aqueous solution that contains manganese as a metal component may contain a metallic compound that contains the metal component. In other words, for example, an aqueous solution that contains cobalt as a metal component may contain a metallic compound that contains cobalt.

Furthermore, as the metallic compound, it is favorable to use a water-soluble metallic compound, and as such water-soluble metallic compounds, nitrate, sulfate, hydrochloride, and the like may be listed. Specifically, nickel sulfate, cobalt sulfate, manganese sulfate, and the like may be suitably used. Note that a compound that contains a hydrate may also be used.

These solutions of an aqueous solution that contains nickel as a metal component, an aqueous solution that contains cobalt as a metal component, and an aqueous solution that contains manganese as a metal component may be partially or entirely mixed in advance, to be added to the initial aqueous solution as the metal-component-containing mixed aqueous solutions.

The composition ratio of each metal in the precursor to be obtained becomes substantially the same as the composition ratio of the metal in each of the metal-component-containing mixed aqueous solutions. Therefore, it is favorable to prepare each of the metal-component-containing mixed aqueous solutions by adjusting the ratio of a metallic compound to be dissolved such that the composition ratio of each metal contained in the metal-component-containing mixed aqueous solution to be added in the initial aqueous solution in the nucleation process, becomes equivalent to the composition ratio of the metal in the precursor to be generated.

Note that in the case where mixing multiple metallic compounds makes specific metallic compounds react with each other to generate an unnecessary compound, the metal-component-containing aqueous solutions including an aqueous solution that contains nickel as a metal component, may be added simultaneously in the initial aqueous solution at predetermined ratios.

In the case where the metal-component-containing aqueous solutions including an aqueous solution that contains nickel as a metal component are not mixed, and individually added to the initial aqueous solution, it is favorable to prepare each of the metal-component-containing mixed aqueous solutions such that the composition ratio of each metal becomes equivalent to the composition ratio of the metal in the precursor to be generated, in the entirety of the metal-component-containing aqueous solutions to be added.

Furthermore, the adjusted individual metal-component-containing aqueous solutions can be supplied simultaneously into the reaction vessel at predetermined ratios.

As described already, the precursor manufactured by the method for manufacturing a precursor in the embodiment contains a nickel-cobalt-manganese carbonate compound represented by a general formula of $Ni_xCo_yMn_zM_tCO_3$ where $x+y+z+t=1$, $0.05 \le x \le 0.3$, $0.1 \le y \le 0.4$, $0.55 \le z \le 0.8$, and $0 \le t \le 0.1$ are satisfied; and M represents one or more additive elements selected from among Mg, Ca, Al, Ti, V, Cr, Zr, Nb, Mo, and W.

In other words, in addition to nickel, cobalt, and manganese, it is possible to further contain the other additive elements.

Therefore, in the nucleation process, when necessary, it is possible to add an aqueous solution that contains one or more additive elements (also simply referred as an "aqueous solution that contains the additive elements", below) selected from among Mg, Ca, Al, Ti, V, Cr, Zr, Nb, Mo, and W (also simply referred as the "additive element(s)", below)

in the initial aqueous solution. Note that in the case where metal-component-containing aqueous solutions including an aqueous solution that contains nickel as a metal component are mixed as a single metal-component-containing mixed aqueous solution, to be added in the initial aqueous solution, the metal-component-containing mixed aqueous solution may have been added and mixed with aqueous solutions that contain the respective additive elements.

Also, in the case where metal-component-containing aqueous solutions including an aqueous solution that contains nickel as a metal component are not mixed, and individually added in the initial aqueous solution, accordingly, it is possible to add aqueous solutions that contain the respective additive elements individually to the initial aqueous solution.

Here, it is possible to prepare an aqueous solution including an additive element by using, for example, a compound that contains the additive element. Furthermore, as the compounds containing the additive elements, it is favorable to use water-soluble compounds that include, for example, titanium sulfate, ammonium peroxotitanate, potassium titanium oxalate, vanadium sulfate, ammonium vanadate, chromous sulfate, potassium chromate, zirconium sulfate, zirconium nitrate, niobium oxalate, ammonium molybdate, sodium tungstate, and ammonium tungstate, which can be selected in accordance with the element to be added.

Also, it is favorable that the above additive elements of the above nickel-cobalt-manganese carbonate compound include molybdenum. Therefore, as an aqueous solution containing the additive elements, it is possible to favorably use, for example, an aqueous solution containing a compound that contains molybdenum.

Furthermore, in the case where the additive elements includes molybdenum, as described already, as described already, it is favorable that the content ratio of Mo is greater than or equal to 0.5 at % and less than or equal to 5 at % among the metal components in the above nickel-cobalt-manganese carbonate compound, namely, among Ni, Co, Mn, and the additive elements M. Therefore, it is favorable to adjust the amount of an aqueous solution to be added that contains the additive elements so that the content ratio of Mo among the metal components in the nickel-cobalt-manganese carbonate compound contained in the precursor to be obtained is within the above range.

It is favorable that the additive elements are uniformly dispersed in a secondary particle contained in the precursor (also simply referred as a "precursor particle", below) and/or are uniformly coated on the surface of the secondary particle.

Furthermore, it is possible to uniformly disperse the additive elements in a precursor particle, by adding an aqueous solution that contains the additive elements described above to the initial aqueous solution.

Also, in order to uniformly coat the surface of a precursor particle with the additive elements, it is possible to perform a coating process of coating the additive elements, for example, after completion of the nucleus growth process, which will be described later. The coating process will be described later in the nucleus growth process.

As described already, in the nucleation process, it is possible to form a mixed aqueous solution so as to form nuclei, by adding and mixing, under the presence of carbonate ions, an aqueous solution that contains nickel as a metal component, an aqueous solution that contains cobalt as a metal component, an aqueous solution that contains manganese as a metal component, and an ammonium ion supplier, with the initial aqueous solution. In this case, the method of supplying carbonate ions is not limited in particular; for example, it is possible to supply carbonate ions into the mixed aqueous solution by supplying carbon dioxide gas into the reaction vessel. It is also possible to supply carbonate ions by using a carbonate when preparing the ammonium ion supplier and the alkaline aqueous solution. Note that supplying carbonate ions by using a carbonate when preparing the ammonium ion supplier and the alkaline aqueous solution, is more favorable because carbonate ions can be directly supplied into the mixed aqueous solution.

As has been described above, in the nucleation process, it is possible to form a mixed aqueous solution so as to form nuclei, by adding and mixing, under the presence of carbonate ions, an aqueous solution that contains nickel as a metal component and the like with the initial aqueous solution.

In this case, it is favorable that the concentration of the metallic compound in the mixed aqueous solution is greater than or equal to 1 mol/L and less than or equal to 2.6 mol/L, and it is more favorable to be greater than or equal to 1.5 mol/L and less than or equal to 2.2 mol/L.

This is because if the concentration of the metallic compound in the mixed aqueous solution is less than 1 mol/L, the amount of crystallized materials per reaction vessel may decrease, and hence, the productivity may decline. This is also because the number of spatial points where crystal growth occurs decreases as a whole, and hence, nucleation may be provoked also in the nucleus growth process.

On the other hand, if the concentration of the metallic compound in the mixed aqueous solution exceeds 2.6 mol/L, it may exceed the saturated concentration at normal temperature, and hence, crystals may be separated again, and may clog laying pipes in a facility.

Note that the concentration of a metallic compound means the concentration of the metallic compound that originates from an aqueous solution that contains nickel as a metal component; an aqueous solution that contains cobalt as a metal component; an aqueous solution that contains manganese as a metal component; and an aqueous solution that contains additive elements that have been further added depending on cases, which have been added to the mixed aqueous solution.

(3) Nucleus Growth Process (Third Process)

Next, the nucleus growth process will be described.

In the nucleus growth process, it is possible to grow nuclei by adding and mixing, under the presence of carbonate ions, an aqueous solution that contains nickel as a metal component, an aqueous solution that contains cobalt as a metal component, an aqueous solution that contains manganese as a metal component, and an ammonium ion supplier, with the mixed aqueous solution formed in the nucleation process.

After completion of the nucleation process, and before starting the nucleus growth process, it is favorable to temporarily stop adding the metal-component-containing aqueous solutions including the aqueous solution that contains nickel as a metal component, the ammonium ion supplier, and the alkaline aqueous solution, and instead, to add an acid aqueous solution to the mixed aqueous solution formed in the nucleation process, so as to lower the pH value of the mixed aqueous solution. Specifically, it is favorable to add the acid so that the pH value of the mixed aqueous solution at the reference reaction temperature of 25° C. becomes greater than or equal to 6.0 and less than or equal to 7.5, and it is more favorable to add the acid to make the pH greater than or equal to 6.5 and less than or equal to 7.5.

Then, it is favorable to perform the nucleus growth process after having the pH value of the mixed aqueous solution take the predetermined value as described above.

Note that although anions in the acid of the acid aqueous solution to be used are not limited in particular, an inorganic acid may be used preferably because an organic acid having a high molecular weight has a low dissociation constant, and may provoke a buffer action of reactive crystallization.

Any inorganic acid has a high dissociation constant, and can be suitably used; in the case of using an inorganic acid as the acid of the acid aqueous solution, it is favorable to use an acid aqueous solution of either sulfuric acid, nitric acid, or hydrochloric acid.

However, for example, in the case of using hydrochloric acid, Cl ions of hydrochloric acid may remain after the precursor has been produced, to generate hydrogen chloride gas during sintering, which may damage the body of a furnace used for sintering. Also, if remaining, $NO_3$ ions of nitric acid may generate NOx during sintering, which may necessitate providing a neutralizing facility. Therefore, taking such load in the manufacturing process into consideration, sulfuric acid is most favorably used in the case of using an inorganic acid as described above. Note that even in the case of using hydrochloric acid or nitric acid, it does not affect characteristics of the positive-electrode active material as the end product.

In the nucleus growth process, as described above, it is possible to add and mix the metal-component-containing aqueous solutions including the aqueous solution that contains nickel as a metal component, and the ammonium ion supplier, with the mixed aqueous solution. In this case, it is favorable to supply and drop the metal-component-containing aqueous solutions including the aqueous solution that contains nickel as a metal component, and the ammonium ion supplier, into the mixed aqueous solution at a fixed rate.

The nucleus growth process enables to deposit dense crystals on the surface of each sparse secondary particle formed in the nucleation process, so as to form the secondary particle having sparse and dense portions.

Note that as in the nucleation process, the metal-component-containing mixed aqueous solutions including the aqueous solution that contains nickel as a metal component may be partially or entirely mixed as a single metal-component-containing mixed aqueous solution to be added to the mixed aqueous solution. Also, in the case where mixing multiple metallic compounds makes specific metallic compounds react with each other to generate an unnecessary compound, each of the metal-component-containing aqueous solutions may be added individually in the initial aqueous solution.

The same aqueous solutions as in the nucleation process can be used as the metal-component-containing aqueous solutions including the aqueous solution containing nickel as a metal component, the ammonium ion supplier, and the alkaline aqueous solution. Also, the concentration and the like may be adjusted in a different way.

In the nucleus growth process, it is also favorable to add an alkaline aqueous solution in the mixed aqueous solution so as to control the pH value of the mixed aqueous solution at the reference reaction temperature of 25° C. to be greater than or equal to 6.0 and less than or equal to 7.5.

This is because having the pH value of the mixed aqueous solution greater than or equal to 6.0 enables to advance crystal growth at a sufficient rate, and enables to prevent the unbalanced concentrations in secondary particles for metal components, namely, nickel, cobalt, and manganese. It is especially favorable to have the pH value of the mixed aqueous solution greater than or equal to 6.5.

Also, having the pH value of the mixed aqueous solution less than or equal to 7.5 enables to securely prevent generation of nuclei more than required for crystal growth. Therefore, it is possible to prevent spread of particle size distribution, and to obtain spherical and uniform secondary particles. Especially, it is possible to prevent generation of grape-shaped aggregated secondary particles having undetermined forms.

In the nucleation process and in the nucleus growth process, it is favorable to blow an inactive gas, for example, nitrogen gas, so as to prevent oxygen from entering the reaction vessel. In other words, it is favorable to have an inactive gas atmosphere in the reaction vessel, for example, it is favorable to have a nitrogen gas atmosphere. However, in the case of using carbon dioxide gas as the source of carbonate ions, in addition to the inactive gas or instead of the inactive gas, it is possible to supply carbon dioxide into the atmosphere in the reaction vessel.

In this way, by blowing an inactive gas and/or carbon dioxide gas into the reaction vessel to prevent oxidization by oxygen in the air, it becomes possible to obtain a precursor having a high purity.

The nucleus growth process can be performed for a period of time in the entire time of the crystallization process in the manufacturing process, excluding the time during which the nucleation process has been performed.

Furthermore, as described already, after having obtained the precursor in the nucleus growth process, it is further possible to have a coating process of coating the surface of obtained precursor particles with the additive elements.

In other words, the method for manufacturing the precursor in the embodiment may further include a coating process of coating secondary particles contained in the precursor obtained in the nucleus growth process, with the additive elements.

The coating process may be, for example, either one of the following processes.

For example, the coating process may be a process in which a slurry having precursor particles suspended is first added with an aqueous solution that contains the additive elements, and thereby, crystallization reaction deposits the additive elements on the surface of precursor particles.

Note that it is favorable to form the slurry having precursor particles suspended, by using an aqueous solution that contains the additive elements to obtain the slurry of the precursor particles. Also, when adding an aqueous solution that contains the additive elements to the slurry having precursor particles suspended, it is favorable to control the pH value of the mixed aqueous solution containing the slurry and the additive elements to be greater than or equal to 6.0 and less than or equal to 9.0. This is because controlling the pH value of the mixed aqueous solution containing the slurry and the additive elements to be greater than or equal to 6.0 and less than or equal to 9.0 while adding the aqueous solution that contains the additive elements, enables crystallization reaction to deposit the additive elements on the surface of precursor particles. This makes it possible to uniformly coat the surface of precursor particles with the additive elements.

Alternatively, the coating process may be a process of spraying and drying slurry or an aqueous solution that contains the additive elements, on precursor particles.

Other than the above, the coating process may be a process of spraying and drying slurry in which precursor particles and compounds containing the additive elements are suspended.

Furthermore, the coating process may be a process of mixing precursor particles and compounds that contain the additive elements by solid-phase synthesis.

Note that the same aqueous solutions as in the nucleation process can be used as the aqueous solutions that contains the additive elements described here. Also, in the coating process, instead of the aqueous solutions that contain the additive elements, an alkoxide solution that contains the additive elements may be used.

As described already, in the nucleation process and in the nucleus growth process, in the case where the initial aqueous solution and the mixed aqueous solution are added with aqueous solutions that contain the additive elements, to perform the coating process so as to coat the surface of precursor particles with the additive elements, it is favorable to reduce the quantity of ions of the additive elements to be added in the initial aqueous solution and the mixed aqueous solution in the nucleation process and the nucleus growth process, by the quantity used for coating. This is because reducing the quantity of the aqueous solutions that contain the additive elements to be added in the initial aqueous solution by the quantity used for coating, enables to obtain a desired value of the atomic number ratio between the additive elements and the other metal components contained in the precursor to be obtained.

Note that the coating process that coats the surface of precursor particles with the additive elements as described above may be applied to precursor particles after completion of the nucleus growth process and after having heated.

The amount of the initial aqueous solution, the metal-component-containing mixed aqueous solutions, and the like supplied into the reaction vessel is not limited in particular; it is favorable to adjust the amount so that at the moment when the reactive crystallization completes, the concentration of crystallized materials is greater than or equal to 30 g/L and less than or equal to 200 g/L, and more favorably to be greater than or equal to 80 g/L and less than or equal to 150 g/L.

This is because in the case of the concentration of crystallized materials greater than or equal to 30 g/L, it is possible to sufficiently secure collision probability of particles, which enables to make the surface of precursor particles sufficiently dense.

However, in the case of the concentration of crystallized materials exceeding 200 g/L, the load of a stirrer of the reaction vessel may become too heavy, and especially in the case of performing operations by a large-sized reaction vessel, a special motor having an excessive torque may be required. Therefore, it is favorable to adjust the amount of supply to the reaction vessel so that the concentration of crystallized materials may become less than or equal to 200 g/L.

In the method for manufacturing the precursor in the embodiment, it is favorable to use a device adopting a scheme of not collecting generated materials until reaction in the nucleus growth process is completed. As such a device, for example, a normally used batch reaction vessel or the like having a stirrer installed may be considered. By adopting such a device, unlike a continuous crystallizer that collects generated materials by overflowing in general, a problem that growing particles are collected simultaneously with an overflowing liquid does not arise. Therefore, particle size distribution becomes narrow, and particles having nearly the same particle diameter can be obtained, which is favorable.

Also, in order to control the atmosphere in the reaction vessel, it is favorable to use a device that is capable of controlling the atmosphere such as a device of a direct vent type.

Using a device that is capable of controlling the atmosphere in the reaction vessel enables to form precursor particles having the structure as described above, and enables to securely advance reaction of each process.

By having the above processes performed to complete the nucleus growth process, an aqueous solution of precursor particles, which is a slurry containing the precursor particles, can be obtained. Furthermore, after having completed the nucleus growth process, a cleaning process and a drying process may be performed.

(4) Cleaning Process

In the cleaning process, it is possible to clean the slurry containing precursor particles obtained in the nucleus growth process described above.

In the cleaning process, first, the slurry containing precursor particles may be filtered, and then, washed with water and filtered again.

Filtering may be performed by a method that is used normally, for example, by using a centrifuge and a suction filter.

Also, washing with water may be performed by a method that is used normally, which simply needs to be capable of removing residual materials contained in precursor particles.

For the washing, in order to prevent impurities from intermixing, it is favorable to use water that contains impurities as few as possible, and it is more favorable to use pure water.

(5) Drying Process

In the drying process, it is possible to dry precursor particles washed in the cleaning process. In the drying process, first, the drying temperature may be set, for example, greater than or equal to 100° C. and less than or equal to 230° C., to dry cleaned precursor particles.

After the drying process, the precursor can be obtained.

[Positive Electrode Active Material for Nonaqueous Electrolyte Secondary Battery]

Next, an example of a configuration of a positive-electrode active material for a nonaqueous electrolyte secondary battery will be described according to the embodiment.

A positive-electrode active material for a nonaqueous electrolyte secondary battery in the embodiment may contain a lithium-metal compound oxide represented by a general formula of $Li_{1+\alpha}Ni_xCo_yMn_zM_tO_2$ where $0.25 \leq \alpha \leq 0.55$, $x+y+z+t=1$, $0.05 \leq x \leq 0.3$, $0.1 \leq y \leq 0.4$, $0.55 \leq z \leq 0.8$, and $0 \leq t \leq 0.1$ are satisfied, and M is one or more elements selected from among Mg, Ca, Al, Ti, V, Cr, Zr, Nb, Mo, and W.

Note that it is favorable that the additive elements M in the general formula of the above lithium-metal compound oxide contained in the positive-electrode active material for the nonaqueous electrolyte secondary battery in the embodiment include Mo.

This is because the additive elements M of the lithium-metal compound oxide including Mo enable to raise the initial discharge capacity of the nonaqueous electrolyte secondary battery that uses the positive-electrode active material containing the lithium-metal compound oxide.

Furthermore, it is also favorable that the content ratio of Mo is greater than or equal to 0.5 at % and less than or equal to 5 at % among the metal components other than Li in the lithium-metal compound oxide, namely, among Ni, Co, Mn, and the additive elements M. This is because having the content ratio of Mo greater than or equal to 0.5 at % among the metal components in the lithium-metal compound oxide especially enables to raise the initial discharge capacity of the nonaqueous electrolyte secondary battery that uses the positive-electrode active material for the nonaqueous electrolyte secondary battery containing the lithium-metal compound oxide. This is also because having the content ratio of Mo less than or equal to 5 at % among the metal components in the lithium-metal compound oxide enables to more securely prevent the sphericity of the lithium-metal compound oxide from declining.

Furthermore, the lithium-metal compound oxide may contain secondary particles having the average particle diameter greater than or equal to 4 μm and less than or equal to 8 μm, and the secondary particles may have a particle shape that includes an outer shell portion and a hollow portion surrounded by the outer shell portion.

As described above, secondary particles contained in the positive-electrode active material in the embodiment that have the structure including the outer shell portion and the hollow portion, and have the predetermined average particle diameter, enable the positive-electrode active material to have a high density and a high initial discharge capacity, and to be used as a positive-electrode active material for a nonaqueous electrolyte secondary battery. Note that the positive-electrode active material in the embodiment may be formed of the secondary particles described above.

The positive-electrode active material in the embodiment may contain a lithium-metal compound oxide, which is a lithium-rich nickel-cobalt-manganese composite oxide being a solid solution of two types of layered compounds represented by $Li_2M1O_3$ and $LiM2O_2$.

In the above formulas, M1 represents metallic elements at least including Mn that are adjusted to be tetravalent on average, and M2 represents metallic elements at least including Ni, Co, and Mn that are adjusted to be trivalent on average.

Furthermore, it is assumed that the composition ratios of Ni, Co, and Mn of the precursor described above are satisfied with M1+M2. It is also assumed that $Li_2M1O_3$ is not 0% in terms of the abundance ratio of $Li_2M1O_3$ and $LiM2O_2$ as it is lithium-rich.

(1) Average Particle Diameter

It is possible that secondary particles contained in the positive-electrode active material in the embodiment has the average particle diameter greater than or equal to 4 μm and less than or equal to 8 μm, and it is favorable to be greater than or equal to 5 μm and less than or equal to 7 μm.

Having the average particle diameter greater than or equal to 4 μm enables to increase the packing density of the particles when formed in a positive electrode, and to improve the battery capacity per volume of the positive electrode.

On the other hand, having the average particle diameter less than or equal to 8 μm enables to enlarge the specific surface area of the positive-electrode active material; enables to sufficiently secure the interface between the positive electrode and the electrolytic solution of the battery; enables to control the resistance of the positive electrode; and enables to improve the output characteristic of the battery.

As described above, adjusting the average particle diameter of the positive-electrode active material in the embodiment to be contained in a predetermined range enables to increase the battery capacity per volume in a battery that uses the positive-electrode active material in the embodiment for the positive electrode, and enables to obtain a high-output battery characteristic.

(2) Particle Structure

As described already, the secondary particle contained in the positive-electrode active material in the embodiment may have a hollow structure that includes a hollow portion on the inside of the secondary particle and an outer shell portion on the outside of the hollow portion.

Having such a hollow structure enables to enlarge the surface area for reaction, and allows an electrolytic solution to permeate from the interfaces or voids between primary particles in the outer shell portion, which then enables to absorb and discharge lithium through the reaction interface on the primary particle surfaces on the side of the hollow portion in the particle, by which movement of Li ions and electrons is not hindered, and thus, enables to raise the output characteristic of the battery.

Here, it is favorable that the thickness of the outer shell portion is greater than or equal to 5% and less than or equal to 30%, and it is more favorable to be greater than or equal to 10% and less than or equal to 25% in terms of the ratio to the particle diameter of the secondary particle.

Having the thickness of the outer shell portion greater than or equal to 5% in terms of the ratio to the particle diameter of the secondary particle enables to raise the strength of the secondary particle; prevents the particle from fracturing when handled as a granular material and when formed in a positive electrode of a battery; and enables to raise the battery characteristic.

On the other hand, having the thickness of the outer shell portion less than or equal to 30% in terms of the ratio to the particle diameter of the secondary particle enables to sufficiently secure interfaces or voids between particles through which an electrolytic solution can enter the hollow portion inside of the secondary particle. Therefore, the surface of the hollow portion, which is the inner surface of the particle, can sufficiently contribute to cell reaction, which enables to lower the positive electrode resistance, and enables to raise the output characteristic.

Also, in particular, it is favorable that the thickness of the outer shell portion in the absolute value is within a range greater than or equal to 0.5 μm and less than or equal to 2.0 μm, and it is more favorable to be within a range greater than or equal to 0.8 μm and less than or equal to 1.5 μm.

(3) Characteristics

In the case of using the positive-electrode active material in the embodiment as the positive electrode of, for example, a 2032-type coin battery, a high initial discharge capacity greater than or equal to 200 mAh/g and a high rate characteristic can be obtained with the battery, which exemplifies superior characteristics as a positive-electrode active material for a nonaqueous electrolyte secondary battery. In particular, in the case of using the positive-electrode active material in the embodiment as the positive electrode of the 2032-type coin battery, it is especially favorable that the initial discharge capacity is greater than or equal to 250 mAh/g.

[Method for Manufacturing Positive-Electrode Active Material for Nonaqueous Electrolyte Secondary Battery]

Next, an example of a configuration of a method for manufacturing of a positive-electrode active material for a nonaqueous electrolyte secondary battery (also simply referred as the "method for manufacturing the positive-electrode active material", below) will be described according to the embodiment.

The method for manufacturing the positive-electrode active material in the embodiment is not limited in particular as long as the method can manufacture the positive-electrode active material in which particles have the structure of the positive-electrode active material as described already; it is favorable to adopt the following method because the positive electrode active can be manufactured more securely.

The method for manufacturing the positive-electrode active material in the embodiment may include the following processes.

A heat treatment process of applying heat treatment to a positive-electrode active material precursor for a nonaqueous electrolyte secondary battery obtained by the method for manufacturing the positive-electrode active material precursor for the nonaqueous electrolyte secondary battery as described already, at a temperature greater than or equal to 105° C. and less than or equal to 600° C.

A mixing process of adding and mixing a lithium compound in particles obtained in the heat treatment process, to form a lithium mixture.

A sintering process of sintering the lithium mixture in an oxidizing atmosphere at a temperature greater than or equal to 600° C. and less than or equal to 1000° C.

In the following, each of the processes will be described.

(1) Heat Treatment Process

In the heat treatment process, it is possible to apply heat treatment to the precursor described already at a temperature greater than or equal to 105° C. and less than or equal to 600° C. Applying the heat treatment enables to remove moisture contained in the precursor and to prevent a variation of the ratio of the number of metal atoms and the number of lithium atoms in the positive-electrode active material to be obtained finally.

Note that since what is necessary is to remove moisture to an extent that a variation is not generated in the ratio of the number of metal atoms and the number of lithium atoms in the positive-electrode active material, it is not necessary to convert the entire precursor into a nickel-cobalt-manganese compound oxide. However, in order to further reduce such a variation, it is favorable to set the heating temperature greater than or equal to 500° C. so as to convert the entire precursor into a nickel-cobalt-manganese compound oxide.

In the heat treatment process, the heat treatment temperature is set greater than or equal to 105° C. because if the heating temperature is less than 105° C., surplus moisture in precursor particles may not be removed, and the above variation cannot be controlled.

On the other hand, the heat treatment temperature is set less than or equal to 600° C. because if the heating temperature exceeds 600° C., particles may sinter by the heat treatment, and compound oxide particles having a uniform particle diameter may not be obtained. It is possible to control the above variation by obtaining, in advance by analysis, metal components contained in particles of the precursor corresponding to the heat treatment condition, and determining the ratio to the lithium compound.

Although the heat treatment atmosphere is not limited in particular, it is favorable to be a non-reducible atmosphere, and it is favorable to execute the heat treatment in an air current in which the treatment can be simply applied.

Also, although the heat treatment time is not limited in particular, if the time is less than 1 hour, removal of surplus moisture of the precursor may not be sufficiently performed. Therefore, it is favorable to be at least 1 hour or longer, and it is more favorable to be 2 hours or longer and 15 hours or shorter.

Furthermore, the facility used for heat treatment is not limited in particular, which simply needs to be capable of heating precursor particles in a non-reducible atmosphere, or preferably in an air current; an electric furnace or the like that does not generate gas may be used suitably.

(2) Mixing Process

The mixing process is a process of adding and mixing a lithium compound to heat-treated particles that have been obtained by heating in the above heat treatment process, to form a lithium mixture.

Note that the heat-treated particles that have been obtained by heating in the heat treatment process contain nickel-cobalt-manganese carbonate compound particles and/or nickel-cobalt-manganese compound oxide particles.

It is favorable to mix the heat-treated particles and the lithium compound so that the ratio (Li/Me) of the number of lithium atoms (Li) to the number of metal atoms other than lithium in the lithium mixture, namely, the sum (Me) of the numbers of atoms of nickel, cobalt, manganese, and the additive elements, becomes greater than or equal to 1.2 and less than or equal to 1.8. In this case, it is more favorable to perform mixing so that Li/Me becomes greater than or equal to 1.4 and less than or equal to 1.6.

In other words, since Li/Me does not change before and after the sintering process, Li/Me obtained in this mixing process turns out to Li/Me in the positive-electrode active material. Therefore, mixing is performed in which Li/Me in the lithium mixture is the same as Li/Me in the positive-electrode active material to be obtained.

Although the lithium compound used for forming the lithium mixture is not limited in particular, one or more selected from among, for example, lithium hydroxide, lithium nitrate, and lithium carbonate may be preferably used as the lithium compound because these are readily available.

Especially, taking easiness of handling and stability of quality into consideration, it is more favorable to use one or more selected from among lithium hydroxide and lithium carbonate as the lithium compound used when forming the lithium mixture.

It is possible to use a common mixer for mixing; for example, a shaker mixer, a Lödige Mixer, a Julia Mixer, a V blender, or the like may be used.

(3) Sintering Process

The sintering process is a process of sintering the lithium mixture obtained in the above mixing process, to form the positive-electrode active material. When the lithium mixture is sintered in the sintering process, lithium in the lithium compound diffuses in heat-treated particles, and thereby, a lithium-nickel-cobalt-manganese compound oxide is formed.

The sintering temperature of the lithium mixture in this process is not limited in particular; for example, it is favorable to be greater than or equal to 600° C. less than or equal to 1000° C., and it is more favorable to be greater than or equal to 800° C. less than or equal to 900° C.

This is because that having the sintering temperature greater than or equal to 600° C. enables to sufficiently accelerate diffusion of lithium in the heat-treated particles, to prevent excessive lithium and unreacted particles from remaining, and to obtain a sufficient battery characteristic in the case of using it for a battery.

However, if the sintering temperature exceeds 1000° C., sintering may occur violently among compound oxide particles, and abnormal particle growth may occur, which may make the sintered particles bulky to an extent that the form of spherical secondary particles having the hollow structure cannot be maintained. Since such a positive-electrode active material has a reduced specific surface area, in the case of using it for a battery, the resistance of the positive electrode may rise, and the battery capacity may decline.

Note that from the viewpoint of enabling uniform reaction between the heat treatment particles and the lithium compound, it is favorable to raise the temperature up to the above temperature at a temperature rising rate greater than or equal to 3° C./min and less than or equal to 10° C./min.

Furthermore, it is possible to make the reaction further uniform by holding it at a temperature near the melting point of the lithium compound for 1 hour or longer and 5 hours or shorter. In the case of holding the temperature near the melting point of the lithium compound, after that, it is possible to raise the temperature to the predetermined sintering temperature.

Among the sintering time, it is favorable that the holding time at the sintering temperature is 2 hours or longer, and it is more favorable to be 4 hours or longer and 24 hours or shorter.

This is because holding it at the sintering temperature for 2 hours or longer enables to sufficiently accelerate generation of the lithium-nickel-cobalt-manganese compound oxide.

After the holding time at the sintering temperature has elapsed, although it is not a particular limiting requirement, in the case of loading the lithium mixture into a sagger for sintering, in order to prevent degradation of the sagger, it is favorable to cool the atmosphere down to 200° C. or lower, at a decreasing rate greater than or equal to 2° C./min and less than or equal to 10° C./min.

It is favorable to set the atmosphere for the sintering to be an oxidizing atmosphere, it is more favorable to be an atmosphere having the oxygen concentration greater than or equal to 18 vol % and less than or equal to 100 vol %, and it is especially favorable to be a mixed atmosphere of oxygen of such an oxygen concentration and an inactive gas. In other words, it is favorable to perform the sintering in the air or in an oxygen-containing gas.

As described above, the atmosphere having the oxygen concentration greater than or equal to 18 vol % is favorable because setting the oxygen concentration to be greater than or equal to 18 vol % enables to sufficiently improve crystallinity of the lithium-nickel-cobalt-manganese compound oxide.

In particular, taking the battery characteristic into consideration, it is favorable to perform the sintering in an oxygen air current.

Note that although the furnace used for the sintering is not limited in particular and simply needs to be capable of heating the lithium mixture in the air or in an oxygen-containing gas, an electric furnace that does not generate gas is favorable from the viewpoint of keeping the atmosphere in the furnace uniform. Also, it is possible to use either of a batch furnace or a continuous furnace.

Also, in the case of using lithium hydroxide or lithium carbonate as the lithium compound, it is favorable to perform calcinating after having completed the mixing process and before starting the sintering process. It is favorable that the calcinating temperature is lower than the sintering temperature, and is greater than or equal to 350° C. and less than or equal to 800° C., and it is more favorable to be greater than or equal to 450° C. less than or equal to 780° C.

It is favorable that the calcinating time is 1 hour or longer and 10 hours or shorter, and it is more favorable to be 3 hours or longer and 6 hours or shorter.

Note that it is favorable to perform calcinating while holding the calcinating temperature. It is especially favorable to perform calcinating at a reaction temperature between lithium hydroxide or lithium carbonate and heat-treated particles.

In the case where the calcinating has been performed, lithium has diffused into the heat-treated particles sufficiently, which enables to obtain a uniform lithium-nickel-cobalt-manganese compound oxide, and is favorable.

Particles of the lithium-nickel-cobalt-manganese compound oxide obtained by the sintering process may have been aggregated or slightly sintered.

In this case, the particles may be cracked. This enables to obtain the positive-electrode active material in the embodiment including the lithium-nickel-cobalt-manganese compound oxide.

Note that "crack" is used here to mean an operation to loosen an aggregate of multiple secondary particles generated by sintering or necking between the secondary particles during the sintering, by giving mechanical energy to the aggregate so as to separate the secondary particles from each other without hardly destroying the secondary particle themselves.

[Nonaqueous Electrolyte Secondary Battery]

Next, an example of a configuration of a nonaqueous electrolyte secondary battery will be described according to the embodiment. The nonaqueous electrolyte secondary battery in the embodiment can have a positive electrode that uses the positive-electrode active material as described already.

First, the structure of the nonaqueous electrolyte secondary battery in the embodiment will be described.

The nonaqueous electrolyte secondary battery in the embodiment (also simply referred as the "secondary battery", below) may have substantially the same structure as a common nonaqueous electrolyte secondary battery except that the positive electrode material described already is used as the positive-electrode active material.

The secondary battery in the embodiment may have a structure that includes a case, a positive electrode and a negative electrode accommodated in this case, a nonaqueous electrolyte, and a separator.

More specifically, the secondary battery in the embodiment may include an electrode body that has the positive electrode and the negative electrode stacked via the separator. Furthermore, it is possible to have a structure sealed in the case by having the nonaqueous electrolyte permeate the electrode body, and making connections, by using leads for current collection, between the positive electrode current collector of the positive electrode and a positive electrode terminal extending to the outside, and between the negative electrode current collector of the negative electrode and a negative electrode terminal extending to the outside.

Note that it is needless to say that the structure of the secondary battery in the embodiment is not limited to the above example, and the external shape to be adopted may be any of various shapes including a cylindrical shape and a stacked shape.

(Positive Electrode)

First, a positive electrode will be described as a feature of the secondary battery in the embodiment. The positive electrode is a sheet-shaped member that can be formed by applying a paste of a positive-electrode composite material containing the positive-electrode active material described already, to the surface of a current collector made of, for example, aluminum foil, and drying the paste.

Note that the positive electrode is properly processed in accordance with a battery to be used. Such processes may include, for example, a cutting process for forming a suitable size in accordance with a target battery, a process of compression by pressure using a roll press in order to raise the electrode density, and the like.

The positive electrode composite material paste may be formed by adding, kneading, and mixing a solvent with the positive electrode composite material. The positive electrode composite material may be formed by mixing a powdered positive-electrode active material described already with a conductive material and a binding agent.

The conductive material is added in order to give a suitable conductivity to the electrode. This conductive material is not limited in particular; for example, carbon black materials, such as graphite (natural graphite, artificial graphite, expanded graphite, etc.), acetylene black, and Ketjen-black, may be used.

The binding agent plays a role of binding positive-electrode active material particles. The binding agent used for this positive electrode composite material is not limited in particular; it is possible to use, for example, polyvinylidene fluoride (PVDF), polytetrafluoroethylene (PTFE), fluororubber, ethylene-propylene-diene rubber, styrene-butadiene, cellulose-based resin, and polyacrylic acid.

Note that activated carbon or the like may be added to the positive electrode composite material, and by adding activated carbon or the like, it is possible to increase the capacity of electric double layers of the positive electrode.

The solvent is to dissolve the binding agent to disperse the positive-electrode active material, the conductive material, activated carbon, and the like in the binding agent. This solvent is not limited in particular; for example, an organic solvent such as N-methyl-2-pyrrolidone may be used.

Also, the mixing ratio of each substance in the positive electrode composite material paste is not limited in particular. For example, in the case of representing the solid content of the positive electrode composite material excluding the solvent by 100 mass parts, as in the positive electrode of a common nonaqueous electrolyte secondary battery, it is possible to have the content of the positive-electrode active material greater than or equal to 60 mass parts and less than or equal to 95 mass parts, the content of the conductive material greater than or equal to 1 mass part and less than or equal to 20 mass parts, and the content of the binding agent greater than or equal to 1 mass part and less than or equal to 20 mass parts.

(Negative Electrode)

The negative electrode is a sheet-shaped member formed by applying a negative electrode composite material paste to the surface of a current collector of metallic foil such as copper, and drying the paste. In this negative electrode, components constituting the negative electrode composite material paste, its combination, and materials of the current collector are formed by substantially the same method as the positive electrode, and various processes may be performed when necessary as done with the positive electrode.

The negative electrode composite material paste is formed to be a paste by adding a suitable solvent to the negative electrode composite material in which a negative electrode active material and a binding agent are mixed.

As the negative electrode active material, for example, a substance containing lithium such as metallic lithium or lithium alloy, or an insertion material capable of sustaining insertion and deinsertion of lithium ions may be used.

The insertion material is not limited in particular; for example, a sintered object of an organic compound such as natural graphite, artificial graphite, and a phenol resin; and a powdery form of a carbon substance such as coke, may be used. In the case of adopting such an insertion material as the negative electrode active material, as in the positive electrode, it is possible to use resin containing fluoride such as PVDF as the binding agent, and it is possible to use an organic solvent such as N-methyl-2-pyrrolidone as a solvent to disperse the negative electrode active material into the binding agent.

(Separator)

The separator is placed to be sandwiched between the positive electrode and the negative electrode, and has a function to separate the positive electrode and the negative electrode and to hold the electrolyte. Such a separator may be a thin film of, for example, polyethylene or polypropylene having a large number of fine openings, and is not particularly limited as long as it has the above functions.

(Nonaqueous Electrolyte)

The nonaqueous electrolyte is obtained by dissolving a lithium salt as a supporting salt in an organic solvent.

As the organic solvent, it is possible to use substances selected from among cyclic carbonates such as ethylene carbonate, propylene carbonate, butylene carbonate, and trifluoropropylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxyethane; sulfur compounds such as ethylmethylsulfone and butane sultone; and phosphorus compounds such as triethyl phosphate and trioctyl phosphate. One of these substances may be used alone or two or more may be mixed to be used.

As the supporting salt, it is possible to use $LiPF_6$, $LiBF_4$, $LiClO_4$, $LiAsF_6$, $LiN(CF_3SO_2)_2$, and a composite salt of these.

Note that the nonaqueous electrolyte may contain a radical scavenger, a surfactant, a flame retardant, and the like in order to improve battery characteristics.

Characteristics of Nonaqueous Electrolyte Secondary Battery in the Present Embodiment The nonaqueous electrolyte secondary battery in the embodiment may have a configuration, for example, as described above that includes the positive electrode using the positive-electrode active material described already. Therefore, it is possible to obtain a high initial discharge capacity and a low positive electrode resistance, to realize a high-capacity and high-output battery.

Use of Secondary Battery of the Embodiment

Having the above characteristics, the secondary battery of the embodiment is suitably used as a power source of a small mobile electronic device (a notebook personal computer, a mobile phone terminal, etc.) that demands a high capacity all the time.

The secondary battery of the embodiment is also suitable for a power source for driving a motor that demands a high output. When a battery is made greater in size, securing the safety may become difficult, and an expensive protection circuit may be indispensable. In contrast, since the secondary battery of the embodiment has a superior safety, securing the safety becomes easier, the protection circuit becomes simplified, and the manufacturing cost can be reduced. The reduced size and higher output enable the secondary battery of the embodiment to be suitably used as a power source for a transportation device that is installed in a limited space.

EXAMPLES

In the following, the present invention will be described more specifically with reference to examples. Note that that the present invention is not limited to the following examples.

In the following, preparation conditions and evaluation results of samples will be described for each of the examples and comparative examples.

Example 1

A precursor was prepared by the following procedure.

Note that throughout the examples and comparative examples, unless stipulated otherwise, samples of special grade reagents manufactured by Wako Pure Chemical Industries, Ltd. were used to prepare precursors, positive-electrode active materials, and secondary batteries.

(Initial Aqueous Solution Preparation Process)

First, pure water and 25 mass % ammonia water were put and mixed in a reaction vessel (5 L), to prepare an initial aqueous solution having the ammonia concentration of 8 g/L. Note that the initial aqueous solution occupied ⅕ of the reaction vessel.

Also, the initial aqueous solution was stirred, and the temperature in the vessel was set to 25° C. Note that the temperature had been maintained until completion of the nucleus growth process. At this time, the reaction vessel was filled with a nitrogen atmosphere (oxygen concentration of 0.3 vol %). A proper amount of a sodium carbonate aqueous solution of 2 mol/L was added to this reaction vessel, so as to adjust the pH value of the reaction liquid in the vessel to 10.0 at the reference liquid temperatures of 25° C.

(Nucleation Process)

Next, nickel sulfate, cobalt sulfate, and manganese sulfate were dissolved in water to prepare a metal component-containing mixed aqueous solution of 1.8 mol/L. In this metal component-containing mixed aqueous solution, the molar ratio of the metal elements was adjusted to be Ni:Co:Mn=0.167:0.167:0.666.

This metal component-containing mixed aqueous solution was added to the initial aqueous solution in the reaction vessel at a rate of 10.9 ml/min to prepare a mixed aqueous solution.

At this time, an ammonium carbonate aqueous solution of 2.7 mol/L was simultaneously added to the initial aqueous solution at a constant rate, to maintain the same value of the ammonia concentration in the generated mixed aqueous solution as in the initial aqueous solution. Furthermore, a sodium carbonate aqueous solution of 2 mol/L as an alkaline aqueous solution was added so as to control the pH value to become 9 (at the reference liquid temperatures of 25° C.).

Among the combined time of the nucleation process and the nucleus growth process, the nucleation process was performed for ¹⁄₁₀ of the combined time, which turned out to be 24 minutes. In other words, crystallization was performed for ¹⁄₁₀ of the entire crystallization time.

(Nucleus Growth Process)

After completion of the nucleation process, dropping of the metal-containing mixed aqueous solution and the ammonia water was temporarily stopped, and instead, sulfuric acid was dropped until the pH value of the mixed aqueous solution became 7.0 (at the reference liquid temperatures of 25° C.). After that, the operation was resumed as in the nucleation process except for maintaining this pH value, to perform crystallization for 4 hours (for 240 minutes) including the nucleation process, namely, since the start of crystallization.

The obtained generated material was filtered, washed and dried to obtain a precursor.

Note that in the above crystallization, pH was controlled by a pH controller by adjusting the supplying flow rate of the sodium carbonate aqueous solution of 2 mol/L, and the range of fluctuation was within a range of the setting value (7.0) plus/minus 0.2.

(Evaluation Result of Precursor)

The obtained precursor was dissolved in an inorganic acid, and then, was chemically analyzed by ICP emission spectrometry; it was confirmed to be a carbonate having the composition of Ni:Co:Mn=16.6:16.7:66.7 (atomic number ratio).

Also, the average particle diameter $D_{50}$ was measured for the precursor by using a laser diffraction-scattering particle size distribution measuring device ("Microtrack HRA" manufactured by Nikkiso Co., Ltd.), and as a result, $D_{50}$ turned out to be 5.8 μm.

Next, the obtained precursor particles were observed by using an SEM (Scanning Electron Microscope S-4700 manufactured by Hitachi High-Technologies Corporation) with a magnification factor of 5000. It was confirmed that the obtained precursor particles were constituted with virtually spherical secondary particles, and the particle diameters were virtually uniform. In this way, in the case where it was confirmed by SEM observation that a precursor was constituted with virtually spherical secondary particles, the sphericity was evaluated as excellent (designated with a circle mark, below); or in the case where it was confirmed that a precursor was constituted with non-spherical secondary particles, the sphericity was evaluated as poor (designated with a cross mark, below). A result of SEM observation is shown in FIG. 1.

Also, a sample of the obtained precursor was embedded in resin, and then, was processed with a cross-sectional polisher, to perform SEM observation. It was confirmed that this precursor was constituted with secondary particles, and the secondary particle was constituted with a sparse central portion and a dense outer shell portion formed of granular fine primary particles.

Note that in the following examples and comparative examples, SEM observation was similarly performed for precursors; in the case where a central portion was constituted with sparse secondary particles formed of granular fine primary particles, it was estimated as "sparse". Also, in the case where a central portion was constituted with dense secondary particles formed of granular fine primary particles, it was estimated as "dense". In addition, in the case where a central portion includes both sparse secondary particles and dense secondary particles formed of granular fine primary particles, it was estimated as "sparse, dense".

In the following examples and comparative example, as for the outer shell portion, the secondary particle of either of the obtained precursors was constituted with a dense outer shell portion.

(Production of Positive-Electrode Active Material)

Heat treatment was applied to the precursor at 500° C. for 2 hours in an airflow (oxygen: 21 vol %) to obtain composite oxide particles as heat-treated particles.

Lithium carbonate was weighed so that Li/Me, which is the ratio of the number (Li) of lithium atoms to the sum (Me) of the numbers of the other metal atoms, became 1.5, and the weighed lithium carbonate was mixed with the above composite oxide particles to prepare a lithium mixture. The mixing was performed by using a shaker mixer device ("TURBULA Type T2C" manufactured by Willy A. Bachofen AG (WAB)).

The obtained lithium mixture was calcined at 500° C. for 4 hours in the atmosphere (oxygen: 21 vol %), sintered at 850° C. for 10 hours, cooled, and then, cracked to obtain a positive-electrode active material.

[Analysis of Positive-Electrode Active Material]

The obtained positive-electrode active material was chemically analyzed by substantially the same method as in the case of the precursor, and the composition turned out to be Li:Ni:Co:Mn=1.47:0.166:0.167:0.667 (atomic number ratio). In other words, a positive-electrode active material represented by $Li_{1.47}Ni_{0.166}Co_{0.167}Mn_{0.667}O_2$ was obtained.

Also, the particle size distribution of the obtained positive-electrode active material was measured by using substantially the same method as in the case of the precursor, and the average particle diameter turned out to be 5.7 μm.

Also, SEM observation and cross-sectional SEM observation were performed for the positive-electrode active material, by substantially the same method as in the case of the precursor.

Figure 2A:
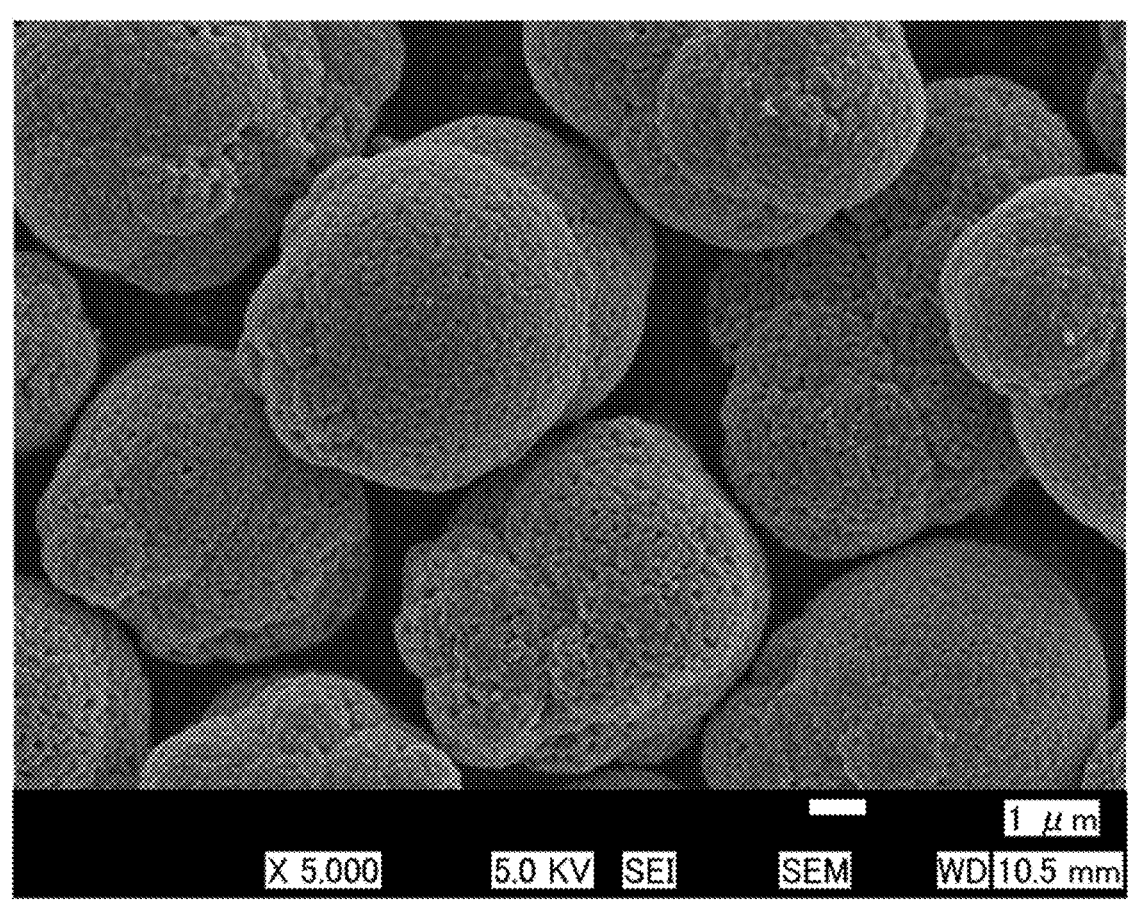
FIG. 2A is an SEM image of a positive-electrode active material for a nonaqueous electrolyte secondary battery obtained in Example 1 according to the present invention.

A result of SEM observation of this positive-electrode active material is shown in FIG. 2A. As can be seen in FIG. 2A, it was confirmed that particles contained in the obtained positive-electrode active material are virtually spherical, and the particle diameters were virtually uniform. In this way, in the case where it was confirmed by an SEM observation that a positive-electrode active material was constituted with virtually spherical secondary particles, the sphericity was evaluated as excellent (designated with a circle mark, below); or in the case of being constituted with non-spherical secondary particles, the sphericity was evaluated as poor (designated with a cross mark, below).

Figure 2B:
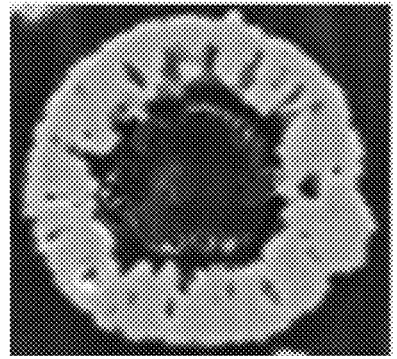
FIG. 2B is a cross-sectional SEM image of a positive-electrode active material for a nonaqueous electrolyte secondary battery obtained in Example 1 according to the present invention.

Also, a cross-sectional image of a typical particle is illustrated in FIG. 2B as a result of cross-sectional SEM observation of a positive-electrode active material. From FIG. 2B, it was confirmed that this positive-electrode active material had a hollow structure including an outer shell portion constituted with sintered primary particles, and a hollow portion inside of the outer shell portion. The ratio of the thickness of the outer shell portion to the particle diameter of the positive-electrode active material obtained from this observation was approximately 22%.

Note that in the case where it was confirmed by the cross-sectional SEM observation that a particle of a positive-electrode active material was formed as a particle having the hollow structure as described above, the evaluation is designated as "hollow", below. Alternatively, in the case where it was confirmed by the cross-sectional SEM observation that a particle of a positive-electrode active material was formed as a particle whose inside is not hollow, but filled with the material, the evaluation is designated as "solid", below. In addition, in the case where hollow particles and solid particles coexisted, the evaluation is designated as "hollow, solid", below.

The specific surface area of the obtained positive-electrode active material was obtained by using a flow type gas adsorption specific surface area measuring device (Multisorb manufactured by Yuasa-Ionics Co., Ltd.), which turned out to be 5.2 m²/g.

[Production of Secondary Battery]

A 2032-type coin battery was produced by using the obtained positive-electrode active material, and evaluated.

Figure 3:
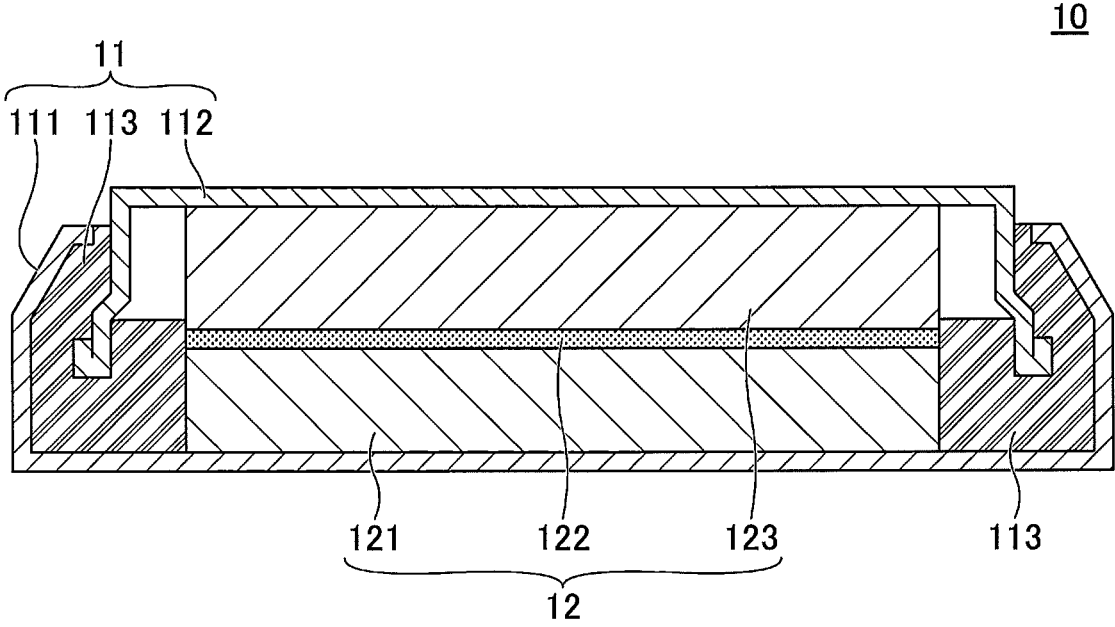
FIG. 3 is a cross-sectional configuration diagram of a secondary battery produced in Examples and Comparative examples.

The configuration of the produced coin battery will be described by using FIG. 3. FIG. 3 schematically illustrates a cross-sectional view of the coin battery.

As illustrated in FIG. 3, this coin battery 10 is configured to have a case 11 and an electrode 12 accommodated in the case 11.

The case 11 includes a positive electrode can 111 that is hollow and has an opening at one end, and a negative electrode can 112 disposed in the opening of the positive electrode can 111. The negative electrode can 112 is disposed in the opening of the positive electrode can 111 such that a space for accommodating the electrode 12 is formed between the negative electrode can 112 and the positive electrode can 111.

The electrode 12 is constituted with a positive electrode 121, a separator 122, and a negative electrode 123 that are staked in this order, and is accommodated in the case 11 such that the positive electrode 121 contacts the inner surface of the positive electrode can 111, and the negative electrode 123 contacts the inner surface of the negative electrode can 112.

Note that the case 11 has a gasket 113 that is fixed so as to maintain an electrically insulated state between the positive electrode can 111 and the negative electrode can 112. Also, the gasket 113 has a function to seal the gap between the positive electrode can 111 and the negative electrode can 112 so as to make the interior of the case 11 airtight and liquid-tight with respect to the outside.

The coin battery 10 was produced as follows. First, 52.5 mg of the obtained positive-electrode active material, 15 mg of acetylene black, and 7.5 mg of polytetrafluoroethylene resin (PTFE) were intermixed with a solvent (N-methyl-2-pyrrolidone), which was then press-molded to produce the positive electrode 121 having the diameter of 11 mm and the thickness of 100 μm. The produced positive electrode 121 was dried in a vacuum dryer at 120° C. for 12 hours. By using the positive electrode 121, the negative electrode 123, the separator 122, and an electrolytic solution, the coin battery 10 was produced in a glove box filled with an Ar atmosphere where the dew point was controlled to be –80° C.

Note that as the negative electrode 123, a negative electrode sheet was used, which had been punched out of copper foil to be shaped as a disk having the diameter of 14 mm, to which graphite powder having the average particle diameter of approximately 20 μm and polyvinylidene fluoride were applied. Also as the separator 122, a porous polyethylene film having the thickness of 25 μm was used. As the electrolytic solution, a mixed solution was used that contained equal amounts of ethylene carbonate (EC) and diethyl carbonate (DEC) with 1 M of $LiClO_4$ as the supporting electrolyte (manufactured by Toyama Pharmaceutical Industry Co., Ltd.).

[Battery Evaluation]

An initial discharge capacity and a positive electrode resistance were defined for evaluating the performance of the obtained coin battery 10 as follows.

The initial discharge capacity of the coin battery 10 is defined as a capacity measured as follows: after having been produced, the coin battery had been left for approximately 24 hours so that the open circuit voltage OCV (open circuit voltage) would have stabilized; charged up to a cutoff voltage of 4.65 V with the current density set to 0.05 C with respect to the positive electrode (where 1 C is assumed to be 270 mA/g); suspended for 1 hour; and then, discharged down to a cutoff voltage of 2.35 V, and the capacity at this moment was measured as the initial discharge capacity.

To obtain the positive electrode resistance, the coin battery 10 was charged with a charging potential set to 4.4 V, to obtain a Nyquist plot by using a frequency response analyzer and a potentiogalvanostat (1255B manufactured by Solartron) to perform measurement with an alternating current impedance method. This Nyquist plot represented the sum of characteristic curves of the solution resistance, the resistance and the capacity of the negative electrode, and the resistance and the capacity of the positive electrode. Therefore, based on this Nyquist plot, an equivalent circuit was used for fitting calculation and for calculating the resistance of the positive electrode. The resistance of the positive electrode of Example 2 was set as a reference, and normalized to 1 so as to perform a relative evaluation.

Battery evaluation was performed on the coin battery having the positive electrode formed by using the positive-electrode active material, and the initial discharge capacity turned out to be 268 mAh/g and the positive electrode resistance (relative value) turned out to be 1.1.

Table 1 includes the production conditions of the above example; Table 2 includes the characteristics of the precursor obtained with the example; Table 3 includes the result of chemical analysis of the obtained positive-electrode active material, namely, the evaluation result of the composition; and Table 4 includes the evaluation result of characteristics of the positive-electrode active material and the coin battery produced by using the positive-electrode active material. Such contents obtained with the following examples and comparative examples are also included in the tables.

Example 2

Except that the liquid temperature of the initial aqueous solution and the mixed aqueous solution in the initial aqueous solution preparation process to the nucleus growth process was changed into 40° C., a precursor, a positive-electrode active material, and a secondary battery were produced and evaluated in the same way as in Example 1. The result is shown in Tables 1 to 4.

Example 3

In order to add molybdenum as an additive element in the nucleation process and the particle growth process, an ammonium molybdate solution was added to the metal component-containing mixed aqueous solution.

Note that ammonium molybdate was added and mixed with the metal component-containing mixed aqueous solution so as to have the Mo ratio of 1.0 at % in the metal component-containing mixed aqueous solution among the sum of Mo and the other transition metal elements Ni, Co, and Mn. In this case, respective molar ratios of the metal elements Ni, Co, and Mn excluding Mo in the metal component-containing mixed aqueous solution were adjusted to Ni:Co:Mn=0.167:0.167:0.666 as in the case of Example 2.

Except for use of the metal component-containing mixed aqueous solution described above, a precursor, a positive-electrode active material, and a secondary battery were produced and evaluated in the same way as in Example 2. The result is shown in Tables 1 to 4.

Note that the composition of the obtained precursor turned out to be Ni:Co:Mn:Mo=16.4:16.5:66.1:1.0 by chemical analysis.

Example 4

In order to add molybdenum as an additive element in the nucleation process and the particle growth process, an ammonium molybdate solution was added to the metal component-containing mixed aqueous solution.

Note that ammonium molybdate was added and mixed with the metal component-containing mixed aqueous solution so as to have the Mo ratio of 3.0 at % in the metal component-containing mixed aqueous solution among the sum of Mo and the other transition metal elements Ni, Co, and Mn. In this case, respective molar ratios of the metal elements Ni, Co, and Mn excluding Mo in the metal component-containing mixed aqueous solution were adjusted to Ni:Co:Mn=0.167:0.167:0.666 as in the case of Example 2.

Except for use of the metal component-containing mixed aqueous solution described above, a precursor, a positive-electrode active material, and a secondary battery were produced and evaluated in the same way as in Example 2. The result is shown in Tables 1 to 4.

Note that the composition of the obtained precursor turned out to be Ni:Co:Mn:Mo=16.1:16.2:64.7:3.0 by chemical analysis.

Example 5

In order to add molybdenum as an additive element in the nucleation process and the particle growth process, an ammonium molybdate solution was added to the metal component-containing mixed aqueous solution.

Note that ammonium molybdate was added and mixed with the metal component-containing mixed aqueous solution so as to have the Mo ratio of 5.0 at % in the metal component-containing mixed aqueous solution among the sum of Mo and the other transition metal elements Ni, Co, and Mn. In this case, respective molar ratios of the metal elements Ni, Co, and Mn excluding Mo in the metal component-containing mixed aqueous solution were adjusted to Ni:Co:Mn=0.167:0.167:0.666 as in the case of Example 2.

Except for use of the metal component-containing mixed aqueous solution described above, a precursor, a positive-electrode active material, and a secondary battery were produced and evaluated in the same way as in Example 2. The result is shown in Tables 1 to 4.

Note that the composition of the obtained precursor turned out to be Ni:Co:Mn:Mo=15.8:15.8:63.4:5.0 by chemical analysis.

Example 6

In order to add molybdenum as an additive element in the nucleation process and the particle growth process, an ammonium molybdate solution was added to the metal component-containing mixed aqueous solution.

Note that ammonium molybdate was added and mixed with the metal component-containing mixed aqueous solution so as to have the Mo ratio of 0.5 at % in the metal component-containing mixed aqueous solution among the sum of Mo and the other transition metal elements Ni, Co, and Mn. In this case, respective molar ratios of the metal elements Ni, Co, and Mn excluding Mo in the metal component-containing mixed aqueous solution were adjusted to Ni:Co:Mn=0.167:0.167:0.666 as in the case of Example 2.

Except for use of the metal component-containing mixed aqueous solution described above, a precursor, a positive-electrode active material, and a secondary battery were produced and evaluated in the same way as in Example 2. The result is shown in Tables 1 to 4.

Note that the composition of the obtained precursor turned out to be Ni:Co:Mn:Mo=16.6:16.6:66.3:0.5 by chemical analysis.

Example 7

Except that the liquid temperature of the initial aqueous solution and the mixed aqueous solution in the initial aqueous solution preparation process to the nucleus growth process was changed into 50° C., a precursor, a positive-electrode active material, and a secondary battery were produced and evaluated in the same way as in Example 1. The result is shown in Tables 1 to 4.

Example 8

Except that the ammonia concentration of the initial aqueous solution and the mixed aqueous solution in the initial aqueous solution preparation process to the nucleus growth process was changed into 3 g/L, a precursor, a positive-electrode active material, and a secondary battery were produced and evaluated in the same way as in Example 2. The result is shown in Tables 1 to 4.

Example 9

Except that the ammonia concentration of the initial aqueous solution and the mixed aqueous solution in the initial aqueous solution preparation process to the nucleus growth process was changed into 15 g/L, a precursor, a positive-electrode active material, and a secondary battery were produced and evaluated in the same way as in Example 2. The result is shown in Tables 1 to 4.

Example 10

Except that the pH value of the initial aqueous solution in the initial aqueous solution preparation process was changed into 9.0 (at the reference reaction temperature of 25° C., the same for pH values below), a precursor, a positive-electrode active material, and a secondary battery were produced and evaluated in the same way as in Example 2. The result is shown in Tables 1 to 4.

Example 11

Except that the pH value of the initial aqueous solution in the initial aqueous solution preparation process was changed into 11.0, a precursor, a positive-electrode active material, and a secondary battery were produced and evaluated in the same way as in Example 2. The result is shown in Tables 1 to 4.

Example 12

Except that the pH value of the mixed aqueous solution in the nucleation process was changed into 8.5, a precursor, a positive-electrode active material, and a secondary battery were produced and evaluated in the same way as in Example 2. The result is shown in Tables 1 to 4.

Example 13

Except that the pH value of the mixed aqueous solution in the nucleation process was changed into 10.0, a precursor, a positive-electrode active material, and a secondary battery were produced and evaluated in the same way as in Example 2. The result is shown in Tables 1 to 4.

Example 14

Except that the time of the nucleation process was changed to be 1/20 (12 minutes)) in the combined time of the nucleation process and the nucleus growth process, a precursor, a positive-electrode active material, and a secondary battery were produced and evaluated in the same way as in Example 2. The result is shown in Tables 1 to 4.

Example 15

Except that the time of the nucleation process was changed to be ⅕ (48 minutes)) in the combined time of the nucleation process and the nucleus growth process, a precursor, a positive-electrode active material, and a secondary battery were produced and evaluated in the same way as in Example 2. The result is shown in Tables 1 to 4.

Example 16

Except that the pH value of the mixed aqueous solution in the nucleus growth process was changed into 6.6, a precursor, a positive-electrode active material, and a secondary battery were produced and evaluated in the same way as in Example 2. The result is shown in Tables 1 to 4.

Example 17

Except that the pH value of the mixed aqueous solution in the nucleus growth process was changed into 7.4, a precursor, a positive-electrode active material, and a secondary battery were produced and evaluated in the same way as in Example 2. The result is shown in Tables 1 to 4.

Example 18

In order to add tungsten as an additive element in the nucleation process and thereafter, an ammonium tungstate solution was added to the metal component-containing mixed aqueous solution.

Note that ammonium tungstate was added and mixed with the metal component-containing mixed aqueous solution so as to have the W ratio of 0.5 at % in the metal component-containing mixed aqueous solution among the sum of W and the other transition metal elements Ni, Co, and Mn. In this case, respective molar ratios of the metal elements Ni, Co, and Mn excluding Mo in the metal component-containing mixed aqueous solution were adjusted to Ni:Co:Mn=0.167:0.167:0.666 as in the case of Example 2.

Except for use of the metal component-containing mixed aqueous solution described above, a precursor, a positive-electrode active material, and a secondary battery were produced and evaluated in the same way as in Example 2. The result is shown in Tables 1 to 4.

Note that the composition of the obtained precursor turned out to be Ni:Co:Mn:W=16.5:16.6:66.4:0.5 by chemical analysis.

Example 19

Except that the pH value of the initial aqueous solution in the initial aqueous solution preparation process was changed into 12.0, a precursor, a positive-electrode active material, and a secondary battery were produced and evaluated in the same way as in Example 2. The result is shown in Tables 1 to 4.

Example 20

Except that the pH value of the mixed aqueous solution in the nucleus growth process was changed into 6.0, a precursor, a positive-electrode active material, and a secondary battery were produced and evaluated in the same way as in Example 2. The result is shown in Tables 1 to 4.

Example 21

Except that the time of the nucleation process was changed to be 3/10 (72 minutes) in the combined time of the nucleation process and the nucleus growth process, a precursor, a positive-electrode active material, and a secondary battery were produced and evaluated in the same way as in Example 2. The result is shown in Tables 1 to 4.

Comparative Example 1

Except that the liquid temperature of the initial aqueous solution and the mixed aqueous solution in the initial aqueous solution preparation process to the nucleus growth process was changed into 15° C., a precursor, a positive-electrode active material, and a secondary battery were produced and evaluated in the same way as in Example 2. The result is shown in Tables 1 to 4.

Comparative Example 2

Except that the liquid temperature of the initial aqueous solution and the mixed aqueous solution in the initial aqueous solution preparation process to the nucleus growth process was changed into 60° C., a precursor, a positive-electrode active material, and a secondary battery were produced and evaluated in the same way as in Example 2. The result is shown in Tables 1 to 4.

Comparative Example 3

Except that the ammonia concentration of the initial aqueous solution and the mixed aqueous solution in the initial aqueous solution preparation process to the nucleus growth process was changed into 0 g/L, a precursor, a positive-electrode active material, and a secondary battery were produced and evaluated in the same way as in Example 2. The result is shown in Tables 1 to 4.

Comparative Example 4

Except that the pH value of the initial aqueous solution in the initial aqueous solution preparation process was changed into 8.0, a precursor, a positive-electrode active material, and a secondary battery were produced and evaluated in the same way as in Example 2. The result is shown in Tables 1 to 4.

Comparative Example 5

Except that the pH value of the mixed aqueous solution in the nucleation process was changed into 7.5, a precursor, a positive-electrode active material, and a secondary battery were produced and evaluated in the same way as in Example 2. The result is shown in Tables 1 to 4.

Comparative Example 6

Except that the time of the nucleation process was changed to be 1/50 (4.8 minutes)) in the combined time of the nucleation process and the nucleus growth process, a precursor, a positive-electrode active material, and a secondary battery were produced and evaluated in the same way as in Example 2. The result is shown in Tables 1 to 4.

Comparative Example 7

Except that the pH value of the mixed aqueous solution in the nucleus growth process was changed into 7.7, a precursor, a positive-electrode active material, and a secondary battery were produced and evaluated in the same way as in Example 2. The result is shown in Tables 1 to 4.

TABLE 1

| | Additive element M | | Initial aqueous solution preparation process | | | Nucleation process | | | Nucleus growth | Manufacturing process of positive electrode active material | | |
|---|---|---|---|---|---|---|---|---|---|---|---|---|
| | Type of element | Amount of additive (at %) | Solution temperature (° C.) | Ammonia concentration in initial aqueous solution (g/L) | pH of initial aqueous solution | pH of mixed aqueous solution | Time | process pH of mixed aqueous solution | Heat-treatment temperature (° C.) | Li/Me in Lithium mixture | Sintering temperature (° C.) |
| Ex. 1 | — | 0 | 25 | 8 | 10 | 9 | 0.1 | 7 | 500 | 1.5 | 850 |
| Ex. 2 | — | 0 | 40 | 8 | 10 | 9 | 0.1 | 7 | 500 | 1.5 | 850 |
| Ex. 3 | Mo | 1 | 40 | 8 | 10 | 9 | 0.1 | 7 | 500 | 1.5 | 850 |
| Ex. 4 | Mo | 3 | 40 | 8 | 10 | 9 | 0.1 | 7 | 500 | 1.5 | 850 |
| Ex. 5 | Mo | 5 | 40 | 8 | 10 | 9 | 0.1 | 7 | 500 | 1.5 | 850 |
| Ex. 6 | Mo | 0.5 | 40 | 8 | 10 | 9 | 0.1 | 7 | 500 | 1.5 | 850 |
| Ex. 7 | — | 0 | 50 | 8 | 10 | 9 | 0.1 | 7 | 500 | 1.5 | 850 |
| Ex. 8 | — | 0 | 40 | 3 | 10 | 9 | 0.1 | 7 | 500 | 1.5 | 850 |
| Ex. 9 | — | 0 | 40 | 15 | 10 | 9 | 0.1 | 7 | 500 | 1.5 | 850 |
| Ex. 10 | — | 0 | 40 | 8 | 9 | 9 | 0.1 | 7 | 500 | 1.5 | 850 |
| Ex. 11 | — | 0 | 40 | 8 | 11 | 9 | 0.1 | 7 | 500 | 1.5 | 850 |
| Ex. 12 | — | 0 | 40 | 8 | 10 | 8.5 | 0.1 | 7 | 500 | 1.5 | 850 |
| Ex. 13 | — | 0 | 40 | 8 | 10 | 10 | 0.1 | 7 | 500 | 1.5 | 850 |
| Ex. 14 | — | 0 | 40 | 8 | 10 | 9 | 0.05 | 7 | 500 | 1.5 | 850 |
| Ex. 15 | — | 0 | 40 | 8 | 10 | 9 | 0.2 | 7 | 500 | 1.5 | 850 |
| Ex. 16 | — | 0 | 40 | 8 | 10 | 9 | 0.1 | 6.6 | 500 | 1.5 | 850 |
| Ex. 17 | — | 0 | 40 | 8 | 10 | 9 | 0.1 | 7.4 | 500 | 1.5 | 850 |
| Ex. 18 | W | 0.5 | 40 | 8 | 10 | 9 | 0.1 | 7 | 500 | 1.5 | 850 |
| Ex. 19 | — | 0 | 40 | 8 | 12 | 9 | 0.1 | 7 | 500 | 1.5 | 850 |
| Ex. 20 | — | 0 | 40 | 8 | 10 | 9 | 0.1 | 6 | 500 | 1.5 | 850 |
| Ex. 21 | — | 0 | 40 | 8 | 10 | 9 | 0.3 | 7 | 500 | 1.5 | 850 |
| Comp. ex. 1 | — | 0 | 15 | 8 | 10 | 9 | 0.1 | 7 | 500 | 1.5 | 850 |
| Comp. ex. 2 | — | 0 | 60 | 8 | 10 | 9 | 0.1 | 7 | 500 | 1.5 | 850 |
| Comp. ex. 3 | — | 0 | 40 | 0 | 10 | 9 | 0.1 | 7 | 500 | 1.5 | 850 |
| Comp. ex. 4 | — | 0 | 40 | 8 | 8 | 9 | 0.1 | 7 | 500 | 1.5 | 850 |
| Comp. ex. 5 | — | 0 | 40 | 8 | 10 | 7.5 | 0.1 | 7 | 500 | 1.5 | 850 |
| Comp. ex. 6 | — | 0 | 40 | 8 | 10 | 9 | 0.02 | 7 | 500 | 1.5 | 850 |
| Comp. ex. 7 | — | 0 | 40 | 8 | 10 | 9 | 0.1 | 7.7 | 500 | 1.5 | 850 |

Manufacturing process of precursor

TABLE 2

| | Composition of precursor (at %) | | | | Characteristics of precursor | | |
|---|---|---|---|---|---|---|---|
| | Ni | Co | Mn | Additive element M | Average particle diameter (μm) | Sphericity | Inside of particle |
| Ex. 1 | 16.6 | 16.7 | 66.7 | 0 | 5.8 | ○ | sparse |
| Ex. 2 | 16.7 | 16.6 | 66.7 | 0 | 6.7 | ○ | sparse |
| Ex. 3 | 16.4 | 16.5 | 66.1 | 1.0 | 8.0 | ○ | sparse |
| Ex. 4 | 16.1 | 16.2 | 64.7 | 3.0 | 7.4 | ○ | sparse |
| Ex. 5 | 15.8 | 15.8 | 63.4 | 5.0 | 6.3 | ○ | sparse |
| Ex. 6 | 16.6 | 16.6 | 66.3 | 0.5 | 6.6 | ○ | sparse |
| Ex. 7 | 16.6 | 16.8 | 66.6 | 0 | 5.3 | ○ | sparse |
| Ex. 8 | 16.6 | 16.7 | 66.7 | 0 | 4.3 | ○ | sparse |
| Ex. 9 | 16.6 | 16.7 | 66.7 | 0 | 8.2 | ○ | sparse |
| Ex. 10 | 16.6 | 16.7 | 66.7 | 0 | 8.5 | ○ | sparse |
| Ex. 11 | 16.6 | 16.7 | 66.7 | 0 | 5.9 | ○ | sparse |
| Ex. 12 | 16.6 | 16.7 | 66.7 | 0 | 6.5 | ○ | sparse |
| Ex. 13 | 16.6 | 16.7 | 66.7 | 0 | 5.1 | ○ | sparse |
| Ex. 14 | 16.6 | 16.7 | 66.7 | 0 | 6.1 | ○ | sparse |
| Ex. 15 | 16.6 | 16.7 | 66.7 | 0 | 7.4 | ○ | sparse |
| Ex. 16 | 16.6 | 16.7 | 66.7 | 0 | 5.8 | ○ | sparse |
| Ex. 17 | 16.6 | 16.7 | 66.7 | 0 | 8.1 | ○ | sparse |
| Ex. 18 | 16.5 | 16.6 | 66.4 | 0.5 | 6.6 | ○ | sparse |
| Ex. 19 | 16.6 | 16.7 | 66.7 | 0 | 4.2 | x | sparse |
| Ex. 20 | 16.6 | 16.7 | 66.7 | 0 | 8.6 | ○ | sparse |
| Ex. 21 | 16.6 | 16.7 | 66.7 | 0 | 6.0 | ○ | sparse |

TABLE 2-continued

| | Composition of precursor | | | | Characteristics of precursor | | |
| | (at %) | | | | Average | | |
| | Ni | Co | Mn | Additive element M | particle diameter (μm) | Sphericity | Inside of particle |
|---|---|---|---|---|---|---|---|
| Comp. ex. 1 | 16.6 | 16.7 | 66.7 | 0 | 4.9 | ○ | sparse, dense |
| Comp. ex. 2 | 16.6 | 16.7 | 66.7 | 0 | 3.6 | x | sparse |
| Comp. ex. 3 | 16.6 | 16.7 | 66.7 | 0 | 2.4 | x | sparse |
| Comp. ex. 4 | 16.6 | 16.7 | 66.7 | 0 | 15.6 | ○ | sparse |
| Comp. ex. 5 | 16.6 | 16.7 | 66.7 | 0 | 5.3 | ○ | dense |
| Comp. ex. 6 | 16.6 | 16.7 | 66.7 | 0 | 4.9 | ○ | sparse, dense |
| Comp. ex. 7 | 16.7 | 16.4 | 66.9 | 0 | 12.4 | x | sparse |

TABLE 3

| | Evaluation result of positive electrode active material | | | | |
|---|---|---|---|---|---|
| | Li | Ni | Co | Mn | Additive element M |
| Ex. 1 | 1.47 | 0.166 | 0.167 | 0.667 | 0 |
| Ex. 2 | 1.47 | 0.167 | 0.166 | 0.667 | 0 |
| Ex. 3 | 1.48 | 0.164 | 0.165 | 0.661 | 0.01 |
| Ex. 4 | 1.51 | 0.161 | 0.162 | 0.647 | 0.03 |
| Ex. 5 | 1.50 | 0.158 | 0.158 | 0.634 | 0.05 |
| Ex. 6 | 1.50 | 0.166 | 0.166 | 0.663 | 0.005 |
| Ex. 7 | 1.49 | 0.166 | 0.168 | 0.666 | 0 |
| Ex. 8 | 1.48 | 0.166 | 0.167 | 0.667 | 0 |
| Ex. 9 | 1.48 | 0.166 | 0.167 | 0.667 | 0 |
| Ex. 10 | 1.48 | 0.166 | 0.167 | 0.667 | 0 |
| Ex. 11 | 1.47 | 0.166 | 0.167 | 0.667 | 0 |
| Ex. 12 | 1.51 | 0.166 | 0.167 | 0.667 | 0 |
| Ex. 13 | 1.51 | 0.166 | 0.167 | 0.667 | 0 |
| Ex. 14 | 1.50 | 0.166 | 0.167 | 0.667 | 0 |

TABLE 3-continued

| | Evaluation result of positive electrode active material | | | | |
|---|---|---|---|---|---|
| | Li | Ni | Co | Mn | Additive element M |
| Ex. 15 | 1.51 | 0.166 | 0.167 | 0.667 | 0 |
| Ex. 16 | 1.47 | 0.166 | 0.167 | 0.667 | 0 |
| Ex. 17 | 1.49 | 0.166 | 0.167 | 0.667 | 0 |
| Ex. 18 | 1.48 | 0.165 | 0.166 | 0.664 | 0.005 |
| Ex. 19 | 1.49 | 0.166 | 0.167 | 0.667 | 0 |
| Ex. 20 | 1.50 | 0.166 | 0.167 | 0.667 | 0 |
| Ex. 21 | 1.51 | 0.166 | 0.167 | 0.667 | 0 |
| Comp. ex. 1 | 1.48 | 0.166 | 0.167 | 0.667 | 0 |
| Comp. ex. 2 | 1.49 | 0.166 | 0.167 | 0.667 | 0 |
| Comp. ex. 3 | 1.49 | 0.166 | 0.167 | 0.667 | 0 |
| Comp. ex. 4 | 1.50 | 0.166 | 0.167 | 0.667 | 0 |
| Comp. ex. 5 | 1.51 | 0.166 | 0.167 | 0.667 | 0 |
| Comp. ex. 6 | 1.50 | 0.166 | 0.167 | 0.667 | 0 |
| Comp. ex. 7 | 1.49 | 0.167 | 0.164 | 0.669 | 0 |

TABLE 4

| | Evaluation result of positive electrode active material | | | | | Evaluation result of battery | |
| | | | | Thickness | | | |
| | Average particle diameter (μm) | Sphericity | Inside of particle | ratio of outer shell portion (%) | Specific surface area (m²/g) | Initial discharge capacity (mAh/g) | Positive electrode resistance (relative ratio) |
|---|---|---|---|---|---|---|---|
| Ex. 1 | 5.7 | ○ | Hollow | 22 | 5.2 | 268 | 1.1 |
| Ex. 2 | 6.7 | ○ | Hollow | 17 | 4.5 | 271 | 1.0 |
| Ex. 3 | 8.0 | ○ | Hollow | 24 | 4.1 | 275 | 1.0 |
| Ex. 4 | 7.2 | ○ | Hollow | 6 | 4.4 | 279 | 1.1 |
| Ex. 5 | 6.2 | ○ | Hollow | 30 | 4.6 | 274 | 1.2 |
| Ex. 6 | 6.5 | ○ | Hollow | 18 | 4.7 | 270 | 0.9 |
| Ex. 7 | 5.0 | ○ | Hollow | 10 | 6.2 | 275 | 0.9 |
| Ex. 8 | 4.2 | ○ | Hollow | 7 | 6.7 | 274 | 0.9 |
| Ex. 9 | 7.8 | ○ | Hollow | 28 | 4.3 | 267 | 1.2 |
| Ex. 10 | 7.9 | ○ | Hollow | 24 | 4.5 | 266 | 1.2 |
| Ex. 11 | 5.5 | ○ | Hollow | 11 | 5.8 | 270 | 1.0 |
| Ex. 12 | 6.4 | ○ | Hollow | 30 | 3.8 | 265 | 1.3 |
| Ex. 13 | 5.0 | ○ | Hollow | 9 | 6.0 | 274 | 0.9 |
| Ex. 14 | 5.9 | ○ | Hollow | 27 | 5.0 | 269 | 1.2 |
| Ex. 15 | 7.2 | ○ | Hollow | 6 | 6.3 | 272 | 0.9 |
| Ex. 16 | 5.5 | ○ | Hollow | 20 | 5.1 | 273 | 1.2 |
| Ex. 17 | 7.7 | ○ | Hollow | 14 | 4.6 | 269 | 1.0 |
| Ex. 18 | 6.4 | ○ | Hollow | 16 | 4.6 | 270 | 1.1 |
| Ex. 19 | 4.0 | x | Hollow | 10 | 7.4 | 270 | 1.0 |
| Ex. 20 | 7.8 | ○ | Hollow | 3 | 6.3 | 213 | 4.6 |
| Ex. 21 | 5.9 | ○ | Hollow | 16 | 4.6 | 246 | 2.7 |
| Comp. ex. 1 | 4.7 | ○ | Hollow, Solid | 42 | 2.4 | 251 | 2.1 |
| Comp. ex. 2 | 3.0 | x | Hollow | 5 | 8.9 | 278 | 0.7 |
| Comp. ex. 3 | 2.4 | x | Hollow | 12 | 7.7 | 276 | 0.7 |

TABLE 4-continued

| | Evaluation result of positive electrode active material | | | | | Evaluation result of battery | |
| | Average particle diameter ($\mu$m) | Sphericity | Inside of particle | Thickness ratio of outer shell portion (%) | Specific surface area ($m^2$/g) | Initial discharge capacity (mAh/g) | Positive electrode resistance (relative ratio) |
|---|---|---|---|---|---|---|---|
| Comp. ex. 4 | 15.3 | ○ | Hollow | 12 | 6.2 | 266 | 1.9 |
| Comp. ex. 5 | 5.3 | ○ | Solid | 37 | 3.2 | 267 | 2.0 |
| Comp. ex. 6 | 4.4 | ○ | Hollow, Solid | 11-46 | 3.4 | 258 | 1.8 |
| Comp. ex. 7 | 12.3 | x | Hollow | 8 | 5.9 | 249 | 1.8 |

It was confirmed from the results in Table 2 that either of the precursors of Examples 1 to 21 exhibited a target composition, and the average particle diameter was also within the predetermined range. Furthermore, it was confirmed that the positive-electrode active material obtained from the precursor was formed as hollow particles having the predetermined average particle diameter as shown in Table 4.

It was confirmed that producing a battery using such a positive-electrode active material enabled to raise the initial discharge capacity sufficiently high.

In contrast, in the comparative examples 1 to 7, it was confirmed that there were cases where a precursor included a dense part in the central portion, and a precursor had the average particle diameter out of the predetermined range.

Thus, in the case of using one of these precursors to produce a positive-electrode active material, it was confirmed that hollow particles were not obtained, and/or particles did not have a desired average particle diameter.

As above, a positive-electrode active material precursor for a nonaqueous electrolyte secondary battery, a positive-electrode active material for a nonaqueous electrolyte secondary battery, a method for manufacturing a positive-electrode active material precursor for a nonaqueous electrolyte secondary battery, and a method for manufacturing a positive-electrode active material for a nonaqueous electrolyte secondary battery have been described with the embodiments and examples. Note that the present invention is not limited to the embodiments and examples described above; various transformations and modifications can be made within the scope of the subject matters of the present invention described in the claims.

The present application is based on and claims the benefit of priority of Japanese Patent Application No. 2016-001357 filed on Jan. 6, 2016, and Japanese Patent Application No. 2016-186238 filed on Sep. 23, 2016, and the entire contents of Japanese Patent Applications No. 2016-001357 and No. 2016-186238 are herein incorporated by reference.

The invention claimed is:

1. A method for manufacturing a positive-electrode active material precursor for a nonaqueous electrolyte secondary battery containing a nickel-cobalt-manganese carbonate compound represented by a general formula of $Ni_xCo_yMn_zM_tCO_3$ where x+y+z+t=1, $0.05 \leq x \leq 0.3$, $0.1 \leq y \leq 0.4$, $0.55 \leq z \leq 0.8$, and $0 \leq t \leq 0.1$ are satisfied; and M represents one or more additive elements selected from among Mg, Ca, Al, Ti, V, Cr, Zr, Nb, Mo, and W, the method comprising:

an initial aqueous solution preparation process of preparing an initial aqueous solution that contains an ammonium ion supplier and water, in which a pH value is controlled to be greater than or equal to 9.0 and less than or equal to 12.0 by an alkaline aqueous solution at a reference reaction temperature of 25° C., and a liquid temperature is set greater than or equal to 25° C. and less than or equal to 50° C.;

a nucleation process of forming nuclei by adding and mixing, under presence of carbonate ions, an aqueous solution that contains nickel as a metal component, an aqueous solution that contains cobalt as a metal component, an aqueous solution that contains manganese as a metal component, and an ammonium ion supplier, with the initial aqueous solution so as to form a mixed aqueous solution; and a nucleus growth process of growing the nuclei by adding and mixing, under presence of carbonate ions, an aqueous solution that contains nickel as a metal component, an aqueous solution that contains cobalt as a metal component, an aqueous solution that contains manganese as a metal component, and an ammonium ion supplier, with the mixed aqueous solution formed in the nucleation process, wherein in the nucleation process, a pH value of the mixed aqueous solution is controlled to be greater than or equal to 8.0 at the reference reaction temperature of 25° C., by adding an alkaline aqueous solution, thereby controlling the pH value of the mixed aqueous solution while concurrently adding the ammonium ion supplier and the alkaline aqueous solution during the nucleation process, wherein in the nucleus growth process, the pH value of the mixed aqueous solution is controlled to be greater than or equal to 6.0 and less than or equal to 7.5 at the reference reaction temperature of 25° C., by adding the alkaline aqueous solution, and wherein the nucleation process takes a time greater than or equal to $\frac{1}{20}$ and less than or equal to $\frac{3}{10}$ of a combined time of the nucleation process and the nucleus growth process, to add the aqueous solution that contains nickel as the metal component, the aqueous solution that contains cobalt as the metal component, the aqueous solution that contains manganese as the metal component, and the ammonium ion supplier, to the initial aqueous solution.

2. The method for manufacturing the positive-electrode active material precursor for the nonaqueous electrolyte secondary battery as claimed in claim 1, wherein the ammonium ion supplier is either of an ammonium carbonate aqueous solution, ammonia water, an ammonium chloride aqueous solution, or an ammonium sulfate aqueous solution, and wherein the alkaline aqueous solution is an aqueous solution of one or more substances selected from among sodium carbonate, sodium bicarbonate, potassium carbonate, sodium hydroxide, and potassium hydroxide.

3. The method for manufacturing the positive-electrode active material precursor for the nonaqueous electrolyte secondary battery as claimed in claim 1, wherein after completion of the nucleation process and before starting the nucleus growth process, an acid aqueous solution of either sulfuric acid, nitric acid, or hydrochloric acid is added to the mixed aqueous solution so as to lower the pH value of the mixed aqueous solution.

4. The method for manufacturing the positive-electrode active material precursor for the nonaqueous electrolyte secondary battery as claimed in claim 1, wherein during processes ranging from the initial aqueous solution preparation process to the nucleus growth process, an ammonia concentration of the initial aqueous solution and the mixed aqueous solution is controlled to be greater than or equal to 3 g/L and less than or equal to 15 g/L.

5. The method for manufacturing the positive-electrode active material precursor for the nonaqueous electrolyte secondary battery as claimed in claim 1, the method further comprising:

a coating process of coating the secondary particles contained in the positive-electrode active material precursor for the nonaqueous electrolyte secondary battery obtained in the nucleus growth process, with the additive element.

6. A method for manufacturing a positive-electrode active material for a nonaqueous electrolyte secondary battery, the method comprising:

a heat treatment process of applying heat treatment to the positive-electrode active material precursor for the nonaqueous electrolyte secondary battery obtained by the method for manufacturing the positive-electrode active material precursor for the nonaqueous electrolyte secondary battery as claimed in claim 1, at a temperature greater than or equal to 105° C. and less than or equal to 600° C.;

a mixing process of adding and mixing a lithium compound in particles obtained in the heat treatment process, to form a lithium mixture; and a sintering process of sintering the lithium mixture in an oxidizing atmosphere at a temperature greater than or equal to 600° C. and less than or equal to 1000° C.

* * * * *